United States Patent
Chen et al.

(10) Patent No.: US 10,911,286 B2
(45) Date of Patent: Feb. 2, 2021

(54) TECHNIQUES AND APPARATUSES FOR MULTI-CARRIER PROVISION OF ULTRA-RELIABLE LOW LATENCY COMMUNICATIONS IN LTE

(71) Applicant: QUALCOMM Incorporated, San Diego, CA (US)

(72) Inventors: Wanshi Chen, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 15/934,967

(22) Filed: Mar. 24, 2018

(65) Prior Publication Data

US 2018/0287843 A1 Oct. 4, 2018

Related U.S. Application Data

(60) Provisional application No. 62/480,103, filed on Mar. 31, 2017.

(51) Int. Cl.
| | | |
|---|---|---|
| *H04L 27/26* | (2006.01) | |
| *H04W 4/06* | (2009.01) | |
| *H04L 5/00* | (2006.01) | |
| *H04J 11/00* | (2006.01) | |
| *H04L 12/18* | (2006.01) | |

(52) U.S. Cl.
CPC ......... *H04L 27/2646* (2013.01); *H04L 5/001* (2013.01); *H04L 27/2602* (2013.01); *H04W 4/06* (2013.01); *H04J 11/0073* (2013.01); *H04L 12/189* (2013.01); *H04L 27/2672* (2013.01)

(58) Field of Classification Search
CPC ............. H04L 27/2646; H04L 27/2672; H04L 12/189; H04L 5/001; H04W 4/06
See application file for complete search history.

(56) References Cited

U.S. PATENT DOCUMENTS

| | | | |
|---|---|---|---|
| 9,936,498 B2* | 4/2018 | Azarian Yazdi | H04W 72/0446 |
| 10,085,266 B1* | 9/2018 | Pawar | H04L 5/001 |
| 2009/0150742 A1* | 6/2009 | Nebat | H04L 1/0084 |
| | | | 714/751 |
| 2011/0081939 A1* | 4/2011 | Damnjanovic | H04W 52/08 |
| | | | 455/522 |
| 2011/0194499 A1* | 8/2011 | Aiba | H04L 1/1822 |
| | | | 370/328 |
| 2012/0008600 A1* | 1/2012 | Marinier | H04L 5/001 |
| | | | 370/336 |
| 2013/0010684 A1* | 1/2013 | Park | H04L 5/0003 |
| | | | 370/315 |
| 2014/0204854 A1* | 7/2014 | Freda | H04L 1/18 |
| | | | 370/329 |

(Continued)

*Primary Examiner* — Rasheed Gidado
(74) *Attorney, Agent, or Firm* — Harrity & Harrity, LLP

(57) ABSTRACT

A method, an apparatus, and a computer program product for wireless communication are provided. The apparatus may identify a transmit time interval associated with transmission of a transport block; determine a group of one or more component carriers associated with the transmission of the transport block based at least in part on a TTI length of the TTI; and/or perform communication for the transport block based at least in part on the determined group of one or more CCs. Numerous other aspects are provided.

30 Claims, 16 Drawing Sheets

(56) References Cited

U.S. PATENT DOCUMENTS

| | | | |
|---|---|---|---|
| 2014/0376468 A1* | 12/2014 | He | H04B 1/713 370/329 |
| 2015/0373725 A1* | 12/2015 | Oh | H04W 72/082 370/280 |
| 2016/0255594 A1* | 9/2016 | Vajapeyam | H04W 52/346 455/522 |
| 2017/0142704 A1* | 5/2017 | Jung | H04L 5/001 |
| 2017/0215186 A1* | 7/2017 | Chen | H04W 72/0446 |
| 2018/0035329 A1* | 2/2018 | Futaki | H04W 28/06 |
| 2018/0242316 A1* | 8/2018 | Takeda | H04W 72/0446 |
| 2019/0132837 A1* | 5/2019 | Yi | H04L 5/0032 |

* cited by examiner

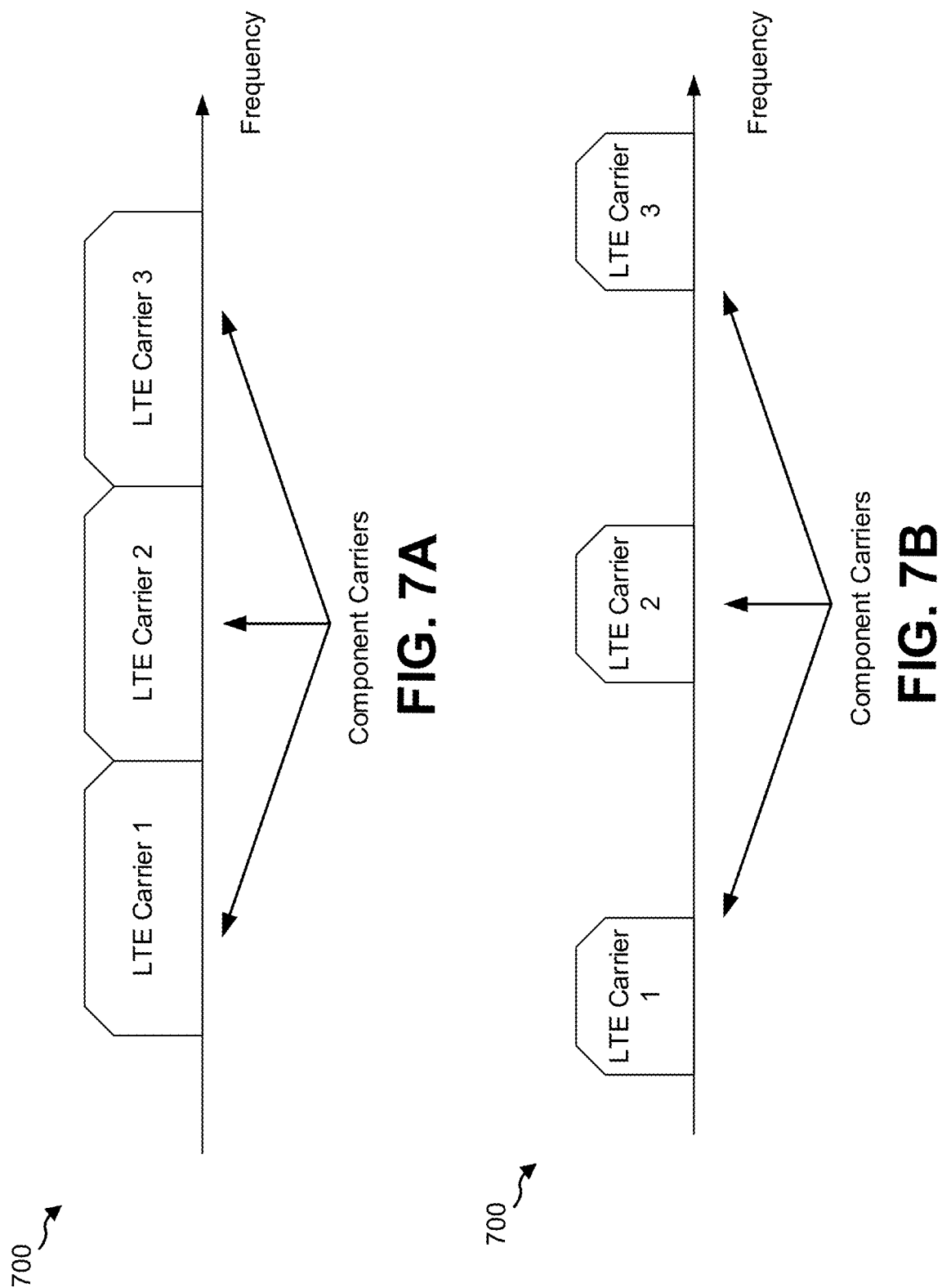

TECHNIQUES AND APPARATUSES FOR MULTI-CARRIER PROVISION OF ULTRA-RELIABLE LOW LATENCY COMMUNICATIONS IN LTE

CROSS-REFERENCE TO RELATED APPLICATION UNDER 35 U.S.C. § 119

This application claims priority to Provisional Patent Application No. 62/480,103, filed Mar. 31, 2017, entitled "TECHNIQUES AND APPARATUSES FOR MULTI-CARRIER PROVISION OF ULTRA-RELIABLE LOW LATENCY COMMUNICATIONS IN LTE," which is hereby expressly incorporated by reference herein.

BACKGROUND

Field

The present disclosure relates generally to communication systems, and more particularly, to techniques and apparatuses for multi-carrier provision of ultra-reliable low latency communications in Long Term Evolution (LTE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, an apparatus, and a computer program product are provided.

In some aspects, the method may be performed by a wireless communication device and may include identifying a transmit time interval (TTI) associated with a transmission of a transport block; determining a group of one or more component carriers (CCs) associated with the transmission of the transport blocks based at least in part on a TTI length of the TTI; and/or performing communication for the transport block based at least in part on the determined group of one or more CCs.

In some aspects, the apparatus may include a memory and at least one processor coupled to the memory and configured to identify a TTI associated with a transmission of a transport block; determine a group of one or more CCs associated with the transmission of the transport blocks based at least in part on a TTI length of the TTI; and/or perform communication for the transport block based at least in part on the determined group of one or more CCs.

In some aspects, the apparatus may include means for identifying a TTI associated with a transmission of a transport block; means for determining a group of one or more CCs associated with the transmission of the transport blocks based at least in part on a TTI length of the TTI; and/or means for performing communication for the transport block based at least in part on the determined group of one or more CCs.

In some aspects, the computer program product may include code for identifying, by a wireless communication device, a TTI associated with a transmission of a transport block; determining, by the wireless communication device, a group of one or more CCs associated with the transmission of the transport blocks based at least in part on a TTI length of the TTI; and/or performing communication for the transport block based at least in part on the determined group of one or more CCs.

In some aspects, the method may be performed by a base station and may include identifying a transmission time interval associated with a transmission of a transport block to a recipient device; determining a group of one or more CCs associated with the transmission of the transport block to the recipient device based at least in part on a TTI length of the TTI; and/or scheduling communication for the transport block based at least in part on the determined group of one or more CCs.

In some aspects, the apparatus may include a memory and at least one processor coupled to the memory and configured to identify a transmission time interval associated with a transmission of a transport block to a recipient device; determine a group of one or more CCs associated with the transmission of the transport block to the recipient device based at least in part on a TTI length of the TTI; and/or schedule communication for the transport block based at least in part on the determined group of one or more CCs.

In some aspects, the apparatus may include means for identifying a transmission time interval associated with a transmission of a transport block to a recipient device; means for determining a group of one or more CCs associated with the transmission of the transport block to the recipient device based at least in part on a TTI length of the TTI; and/or means for scheduling communication for the transport block based at least in part on the determined group of one or more CCs.

In some aspects, the computer program product may include code for identifying, by a base station, a transmission time interval associated with a transmission of a transport block to a recipient device; determining, by the base station a group of one or more CCs associated with the transmission of the transport block to the recipient device based at least in part on a TTI length of the TTI; and/or scheduling, by the base station, communication for the transport block based at least in part on the determined group of one or more CCs.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIG. 7A is a diagram illustrating an example of continuous carrier aggregation.

FIG. 7B is a diagram illustrating an example of non-continuous carrier aggregation.

DETAILED DESCRIPTION

Figure 1:
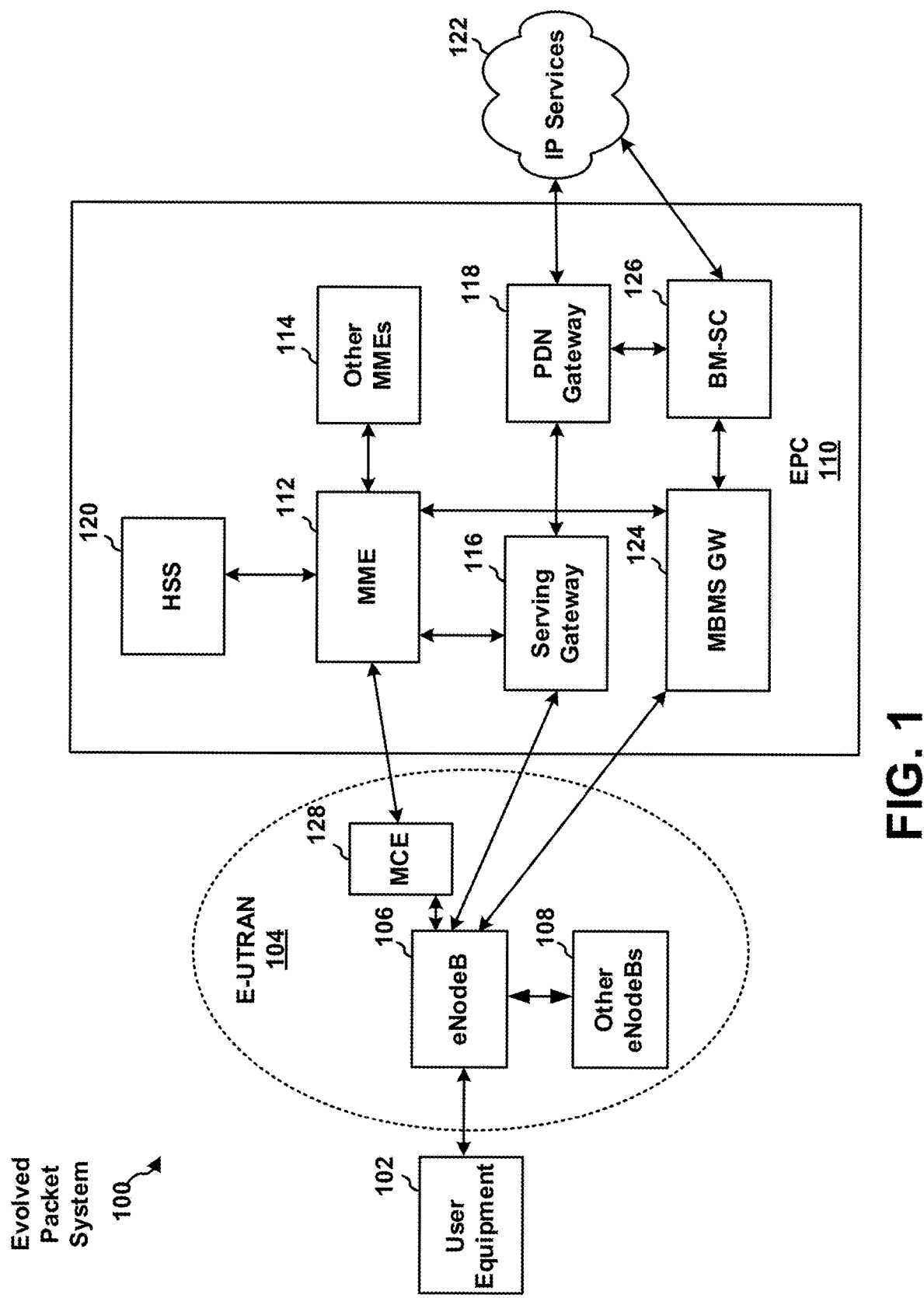
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a packet switched Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

FIG. 1 is provided as an example. Other examples are possible and may differ from what was described in connection with FIG. 1.

Figure 2:
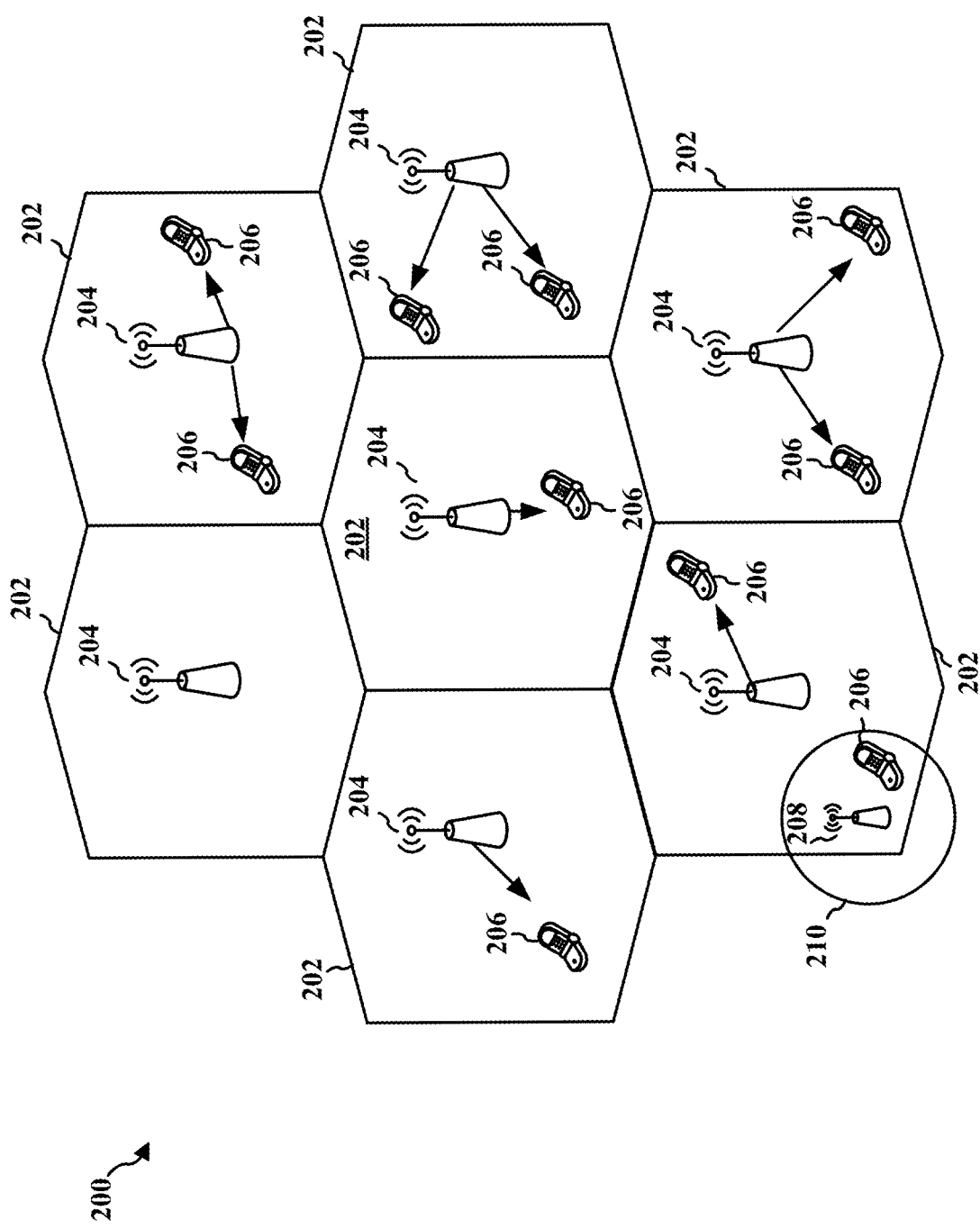
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the Serving Gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, orthogonal frequency division multiplexing (OFDM) is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

FIG. 2 is provided as an example. Other examples are possible and may differ from what was described in connection with FIG. 2.

Figure 3:
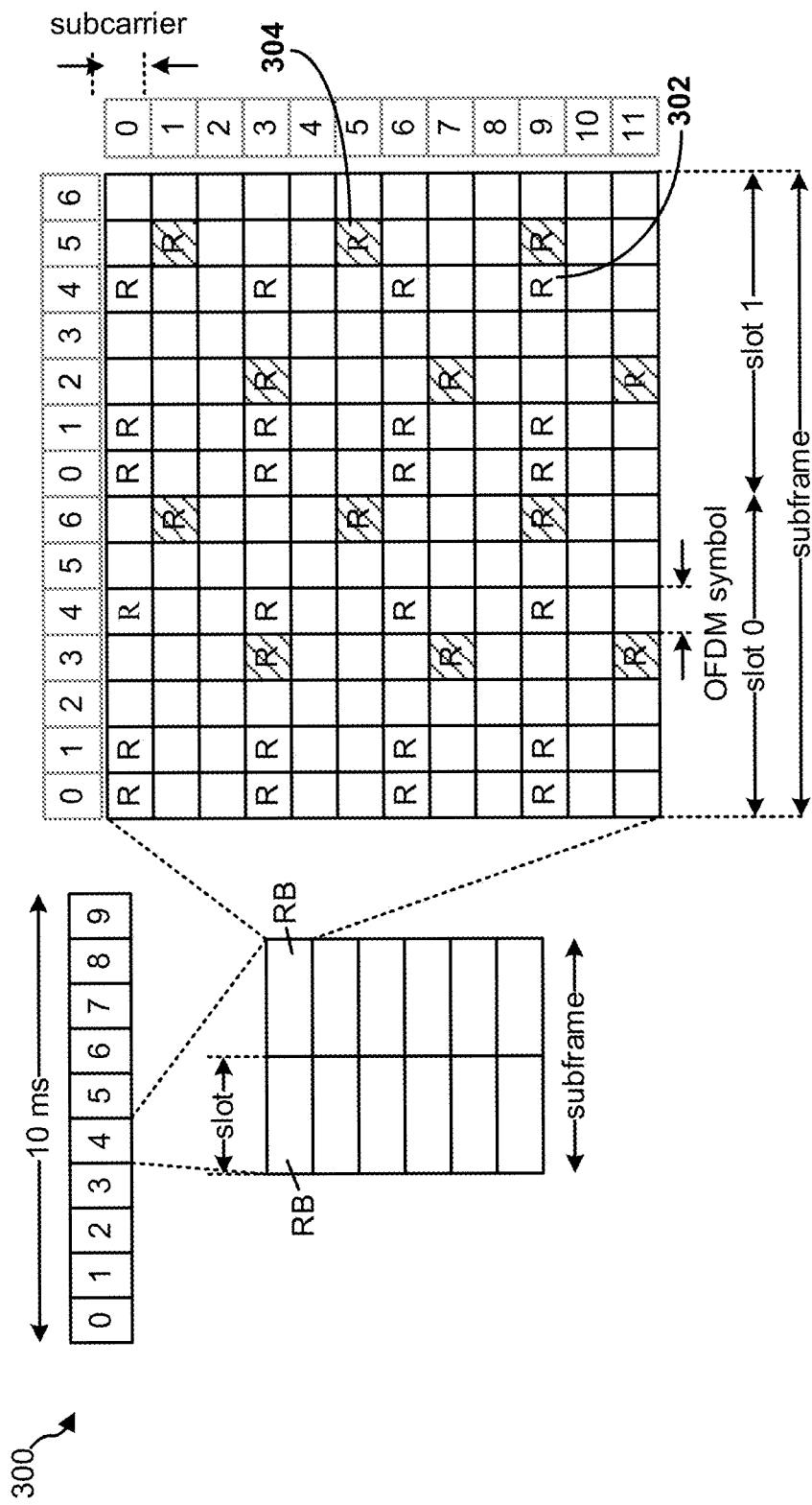
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

FIG. 3 is provided as an example. Other examples are possible and may differ from what was described in connection with FIG. 3.

Figure 4:
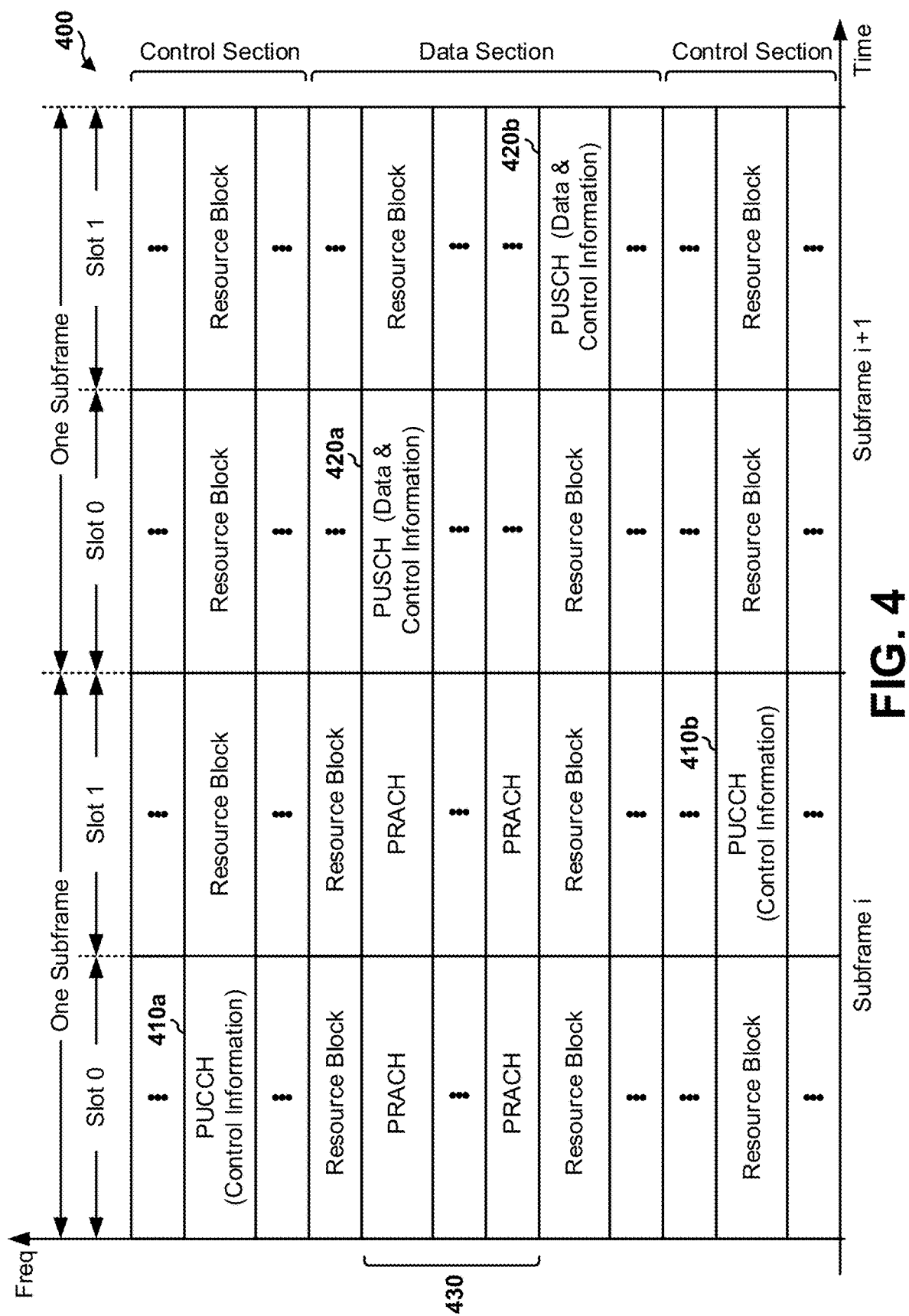
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

FIG. 4 is provided as an example. Other examples are possible and may differ from what was described in connection with FIG. 4.

Figure 5:
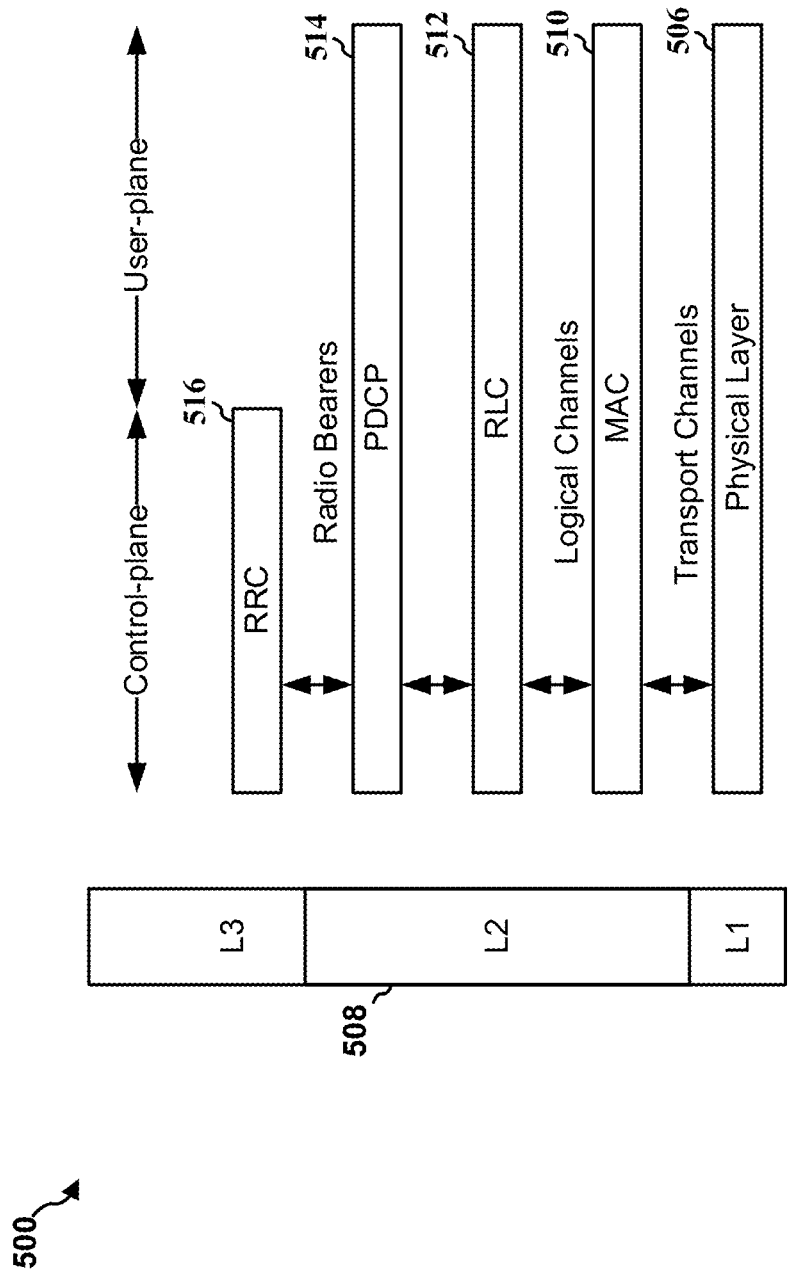
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) sublayer 514, which are terminated at the eNB on the network side. Although not shown, the UE may have several upper layers above the L2 layer 508 including a network layer (e.g., IP layer) that is terminated at the PDN Gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

FIG. 5 is provided as an example. Other examples are possible and may differ from what was described in connection with FIG. 5.

Figure 6:
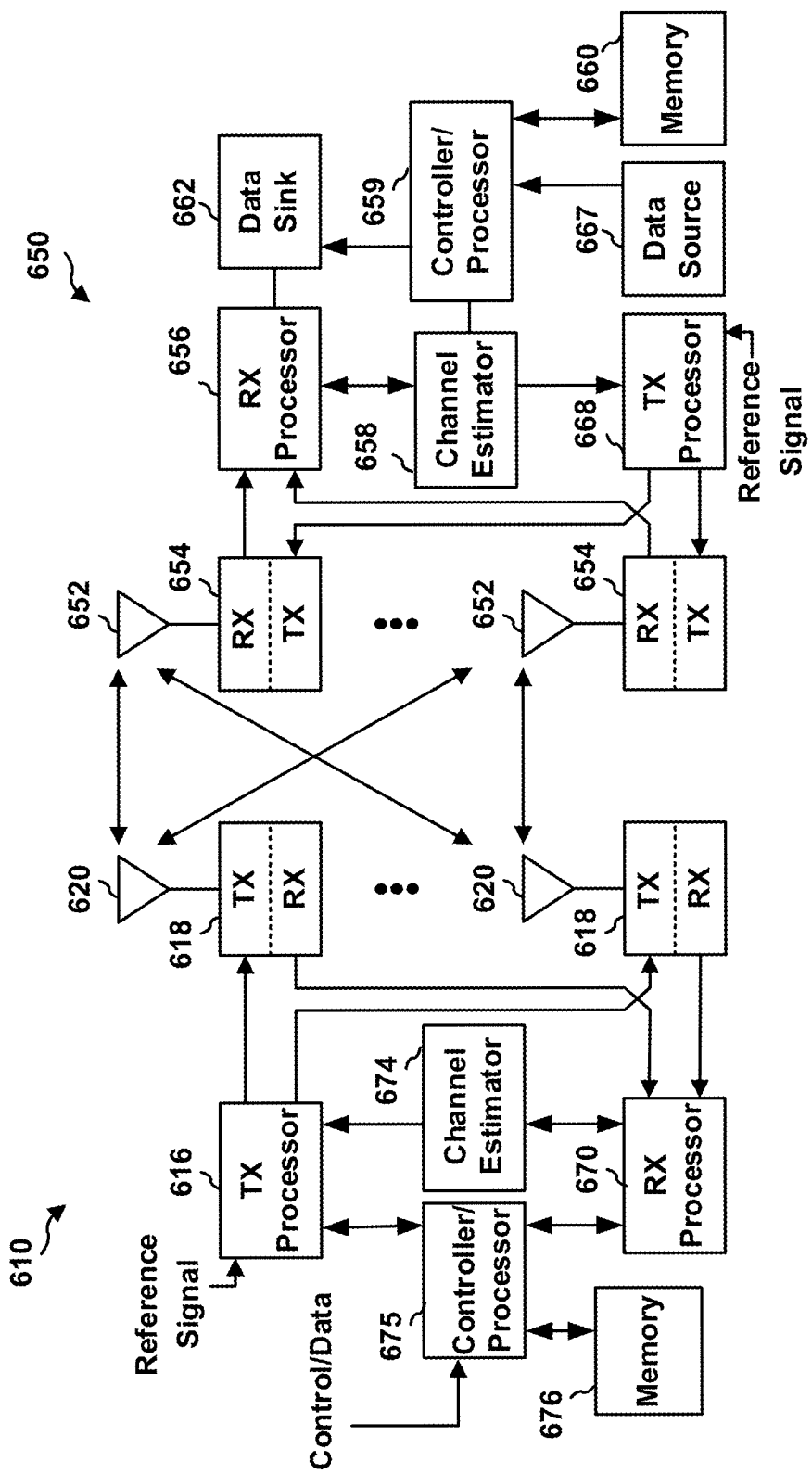
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based at least in part on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based at least in part on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate a radio frequency (RF) carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based at least in part on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based at least in part on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIG. 6 is provided as an example. Other examples are possible and may differ from what was described in connection with FIG. 6.

FIGS. 7A and 7B are examples 700 of carrier aggregation for an LTE UE.

UEs may use spectrum up to 20 MHz bandwidths allocated in a carrier aggregation of up to, for example, 32 component carriers used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments conserve spectrum and are a good fit for the typically asymmetric bandwidth utilization by broadband subscribers.

Two types of carrier aggregation (CA) methods have been proposed, continuous CA and non-continuous CA. The two types of CA methods are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregates multiple LTE/component carriers to serve a single UE.

Furthermore, some CA approaches can use multiple, different duplexing and/or subframe configurations for different carriers. For example, a UE or eNB can use a combination of any one or more of FDD, TDD, and/or Frame Structure Type 3 subframe configurations for each carrier. Furthermore, the UE or eNB may use different subframe configurations for two or more TDD carriers (e.g., subframes with different numerologies, different slot and/or subframe lengths, and/or the like).

Downlink CA carrier(s) may be associated with same-carrier scheduling and/or cross carrier scheduling, primary-cell-only common search space (CSS) monitoring, channel state information measurement and reporting, processing limitation reporting, collision handling, and/or the like. Uplink CA carrier(s) may be associated with primary-cell-only PUCCH transmission (e.g., and/or primary-secondary cell transmission in dual-PUCCH CA or DC (described below)), PUCCH formats 1, 2, 3, 4, and/or 5, a single PUSCH for uplink control information handling, and/or the like.

Dual connectivity (DC) is similar to CA. For example, while CA may be used in situations with good backhaul performance (e.g., low delay between backhaul nodes), DC may be used in situations with subpar backhaul performance (e.g., relatively large delay between backhaul nodes). Whereas CA traffic is split between carriers in the MAC layer, DC traffic may be split between carriers in the PDCP layer. Also, whereas CA typically uses a primary cell (Pcell) configuration, DC may use a primary-secondary cell (pS-cell) or a master cell configuration.

As indicated above, FIGS. 7A and 7B are provided as examples. Other examples are possible, and may differ from what is described herein.

A network may support ultra-reliable low latency communication (URLLC) between UEs and/or eNBs of the network. For example, URLLC traffic may be associated with stringent latency and/or reliability requirements (e.g., 10^-5 reliability with sub-millisecond latency). The requirements imposed on URLLC traffic may mean that the URLLC traffic must be provided at high throughput. For example, when a URLLC communication is of a large size, it may not be possible to provide the URLLC communication over the span of several milliseconds while meeting the sub-millisecond latency requirement. Therefore, flexible networks (e.g., 5G, New Radio, and/or the like) may be well-suited for URLLC traffic, since bandwidth of such networks can be expanded on the fly.

However, not all networks are flexible, which may create problems for URLLC traffic of sufficient size. For example, LTE networks are typically associated with a fixed bandwidth (e.g., 20 MHz per component carrier), which may be further limited in practice due to degraded channel conditions, crowding, and/or the like. Furthermore, a URLLC communication may require a very low coding rate (e.g., 1/12, 1/6, and/or the like) to meet the reliability requirement while simultaneously satisfying the corresponding latency requirement. This problem may be further exacerbated when the LTE network is using a shortened transmission time interval (sTTI), such as a 2-symbol sTTI or a 1-symbol sTTI, which may have lower transmission duration than a longer TTI, such as a 1 ms TT or a 1-slot sTTI. Therefore, there may be a need to have a communication mapping to two or more CCs for 2-symbol sTTI, 1-symbol sTTI, which may be even stronger for CCs of 10 MHz or less.

Implementations described herein enable a wireless communication device or base station (e.g., a UE or an eNB) to divide URLLC traffic over multiple, different component carriers (CCs) so that the URLLC traffic can be provided in accordance with URLLC requirements. For example, the multiple, different CCs may be configured as a group of CCs, and a URLLC communication with performance requirements too challenging to meet for transmission on a single carrier may be mapped to the group of CCs and transmitted in accordance with the URLLC requirements. In some aspects, the group of CCs may be dynamically modified based at least in part on configuration of the wireless communication device and/or a recipient device, traffic requirements, and/or the like. In this way, URLLC may be implemented in a non-flexible network, such as LTE, by simultaneously providing URLLC traffic on multiple, different CCs.

Figure 8A:
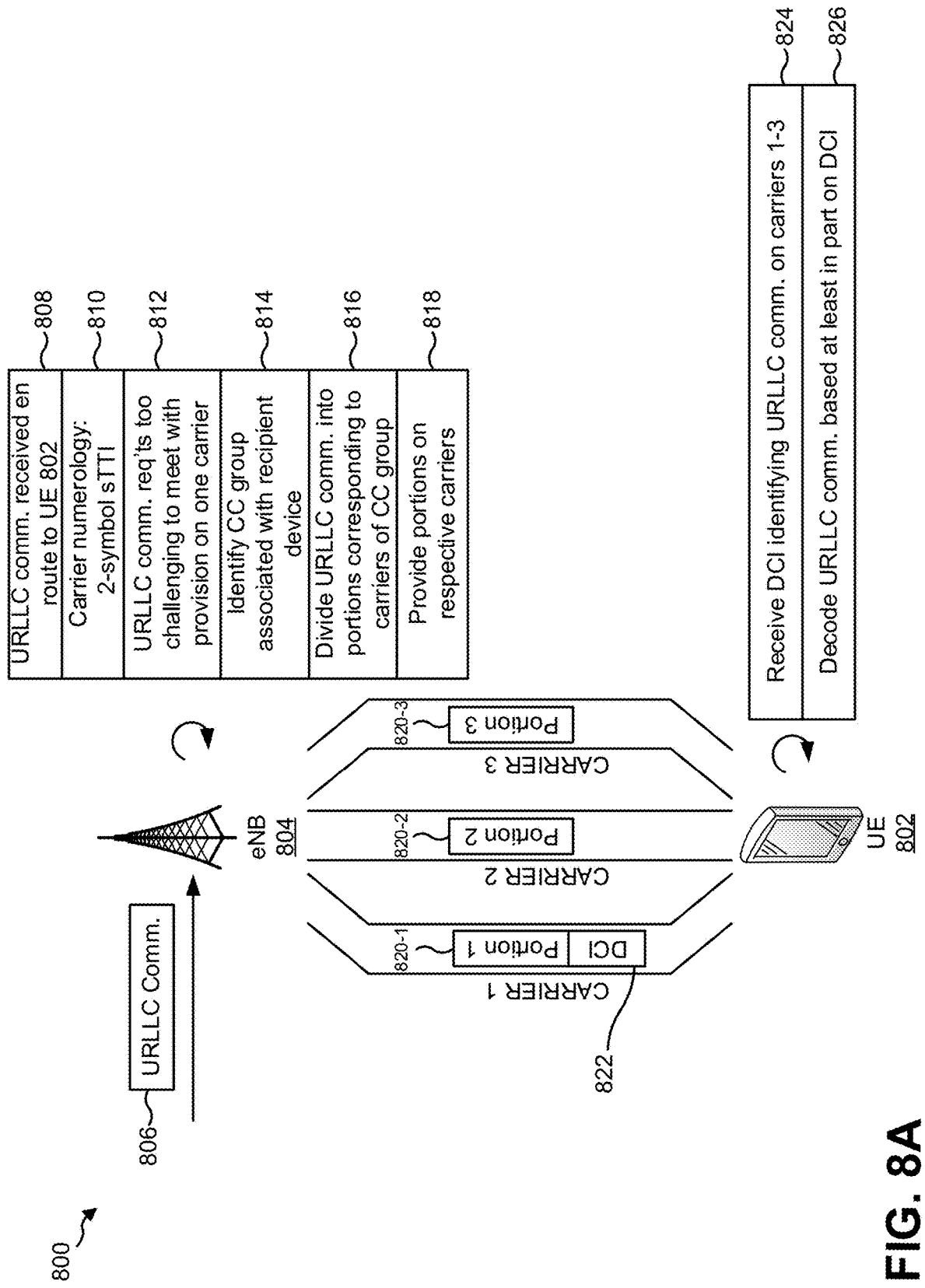
FIGS. 8A-8C are diagrams illustrating an example of providing URLLC traffic on a group of component carriers associated with a recipient device, in accordance with various aspects described herein.
Figure 8B:
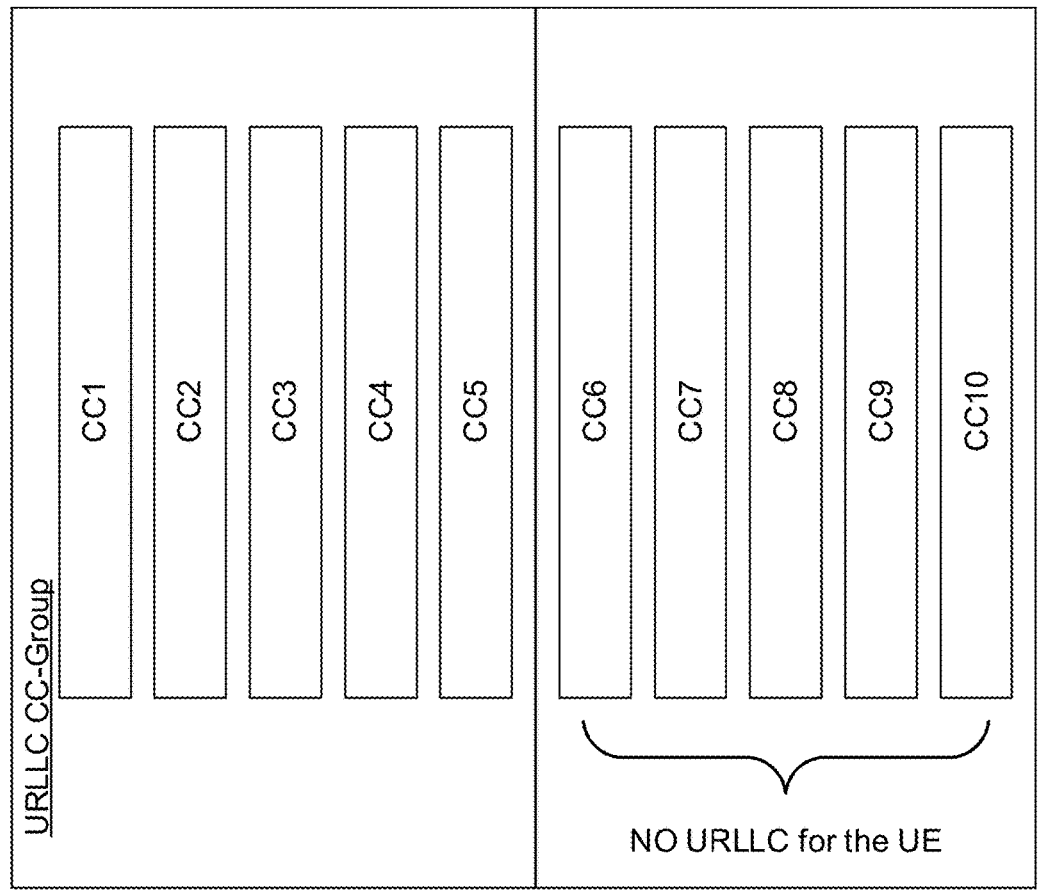
Figure 8C:
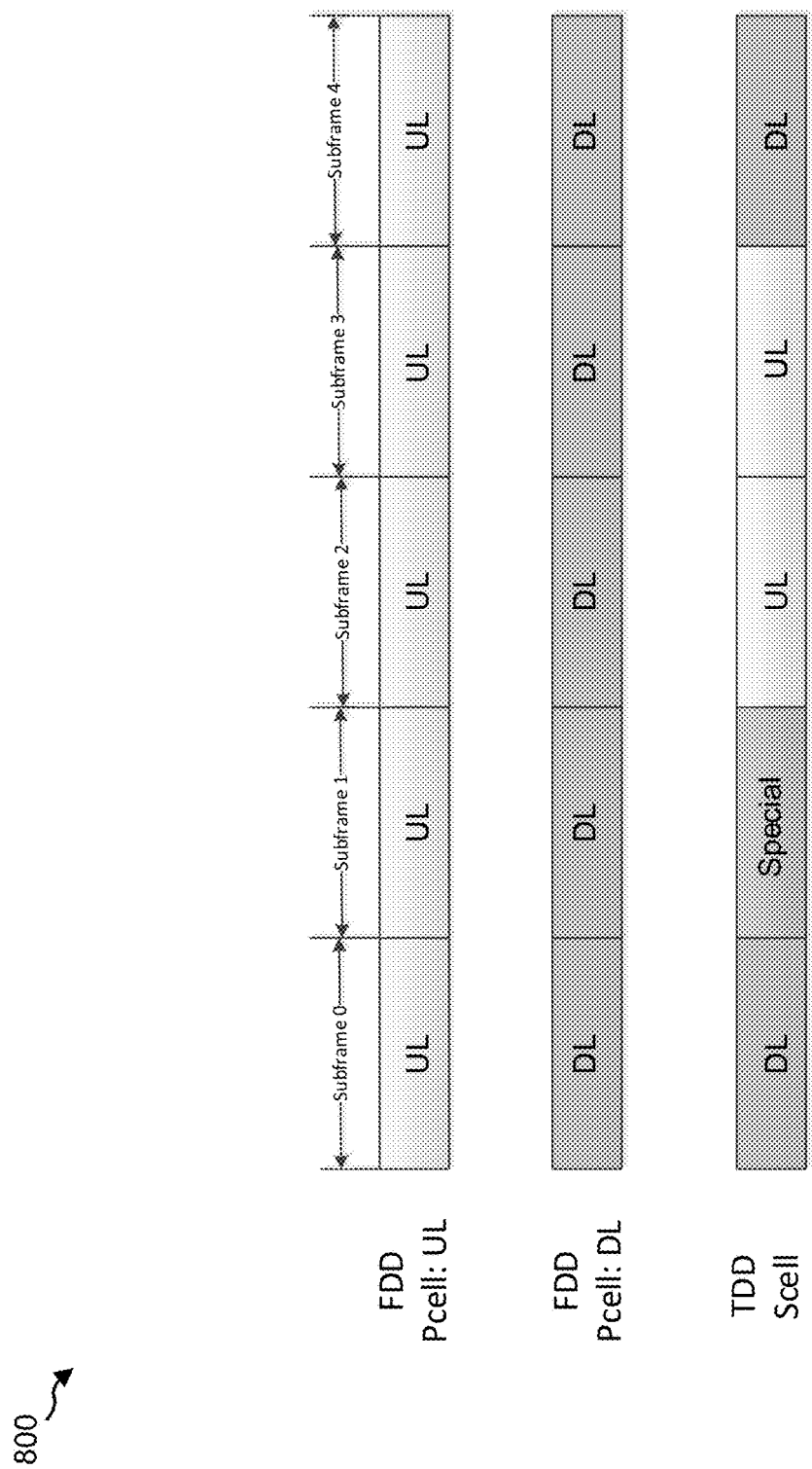

FIGS. 8A-8C are diagrams illustrating an example 800 of providing URLLC traffic on a group of component carriers associated with a recipient device, in accordance with various aspects described herein. As shown, FIG. 8A includes a UE 802 (e.g., the UE 102, 206, 650) and an eNB 804 (e.g., the eNB 106, 204, 610). Here, the UE 802 may be the recipient device.

As shown by reference number 806, the eNB 804 may receive a URLLC communication to be provided to the recipient device (e.g., the UE 802). For example, the URLLC communication may be included in a URLLC traffic flow, or may include a transport block of traffic associated with a particular latency and/or reliability requirement.

As shown by reference number 808, the eNB 804 may determine that the URLLC communication is en route to the UE 802 (e.g., the recipient device). The eNB 804 may identify at least one CC associated with the UE 802. For example, the eNB 804 may identify a set of CCs associated with the UE 802 (e.g., a set of active CCs, a set of established and inactive CCs, a set of CCs capable of carrying URLLC traffic, and/or the like).

As shown by reference number 810, the eNB 804 may determine that the identified CCs are associated with a carrier numerology of a 2-symbol sTTI. For example, the identified CCs may be associated with an LTE radio access technology, and may be associated with a shortened TTI, such as a 2-symbol sTTI or a 1-symbol sTTI. Some aspects described herein are not limited to the sTTIs listed above, and may be used for any TTI length, such as an 8-symbol TTI, a TTI associated with 5G/NR, or a different TTI.

In some aspects, the eNB 804 may establish one or more carriers with regard to the UE 802. For example, the eNB 804 may establish the one or more carriers automatically and/or as part of a URLLC traffic configuration process of the UE 802. Additionally, or alternatively, the eNB 804 may determine that the UE 802 is capable of receiving or transmitting URLLC traffic, and may establish one or more carriers accordingly. In some aspects, the one or more carriers may include multiple different carriers. For example, the one or more carriers may include two carriers, three carriers, five carriers, as many carriers as the UE 802 is capable of supporting, and/or the like.

As shown by reference number 812, the eNB 804 may determine that the URLLC communication is associated with performance requirements too challenging to be provided using a single carrier. For example, the eNB 804 may determine that a size of the URLLC communication exceeds a size that can be provided on a single carrier within a particular time period and/or a desirable coding rate required for the URLLC traffic. In some aspects, the eNB 804 may make such a determination based at least in part on a reliability requirement, a size of the URLLC communication, and/or a length of the particular time period.

As shown by reference number 814, the eNB 804 may identify a CC group associated with the recipient device (e.g., the UE 802). For example, the eNB 804 may identify a CC group of at least two CCs that can be used to provide portions of the URLLC traffic to the UE 802 in a way that satisfies requirements associated with the URLLC traffic.

In some aspects, the eNB 804 may configure the CC group. For example, the eNB 804 may cause one or more CCs to be established and used for the CC group. Additionally, or alternatively, the eNB 804 may provide information to the UE 802 indicating that one or more CCs of the CC group are to be used for URLLC traffic. Additionally, or alternatively, the eNB 804 may identify one or more deactivated CCs for 1-ms TTI of the CC group, and may indicate, to the UE 802, that URLLC traffic, associated with a 2-symbol sTTI, may be received on the one or more deactivated CCs.

For an illustration of a group of one or more CCs, refer to FIG. 8B. As shown in FIG. 8B, ten CCs may be configured for the UE 802 in carrier aggregation. As further shown, the eNB 804 (or the UE 802) may configure CC1, CC2, CC3, CC4, and CC5 as a group of one or more CCs on which to receive or provide URLLC traffic. As further shown, the eNB 804 (or the UE 802) may configure CC6, CC7, CC8, CC9, and CC10 not to be used for URLLC traffic. In this way, one subset of the CCs associated with the UE 802 may be used for URLLC traffic, and another subset of the CCs associated with the UE 802 may be used for other purposes.

In some aspects, the eNB 804 may configure a quantity of CCs associated with the CC group. For example, the eNB 804 may configure a quantity between one CC and a maximum quantity of CCs configured for or supported by the UE 802 and/or the eNB 804. In some aspects, the eNB 804 may use a different quantity of CCs for 2-symbol sTTI CCs than for 1-symbol sTTI CCs, which allows for increased versatility of provision of URLLC traffic. In some aspects, the eNB 804 may use a maximum quantity of CCs. For example, the eNB 804 may limit the CC group to 5 CCs and/or the like. In some aspects, the eNB 804 may configure the quantity of CCs using radio resource control information. For example, the eNB 804 may select a CC group from multiple different CC groups associated with the UE 802, and may provide information to the UE 802 identifying the selected CC group. As an example, a number of CCs in the group of CCs may have an increment step size of 1 or other values, e.g., the configurable number of CCs may be {1, 2, 3, 4, 5, 6}, or may be limited to {1, 2, 4, 6} with an increment step size of 2. In some aspects, the eNB 804 may dynamically configure the CC group. For example, the UE 802 may be associated with 4 configurations (provided via RRC), where each configuration is associated with a different set of CCs for CC grouping. The eNB 804 may dynamically provide a DCI indicating which set is to be used for a URLLC communication.

In some aspects, the CC group may include all CCs associated with the UE 802. In some aspects, the CC group may include a subset of all CCs associated with the UE 802. For example, when the UE 802 is associated with one or more PUCCH CCs, the CC group for the URLLC traffic may not include the one or more PUCCH CCs. Additionally, or alternatively, in some aspects, there may be one URLLC CC group in carrier aggregation. For example, when a single PUCCH is configured for the UE 802, the UE 802 may be associated with one URLLC CC group.

In some aspects, the eNB 804 and/or the UE 802 may be associated with multiple, different CC groups. For example, when the UE 802 is associated with multiple, different PUCCH groups, the UE 802 may be associated with one CC group per PUCCH group. Additionally, or alternatively, when the UE 802 is associated with a dual connectivity arrangement that includes two PUCCH groups, the UE 802 may be associated with two CC groups (e.g., one URLLC CC group per PUCCH group).

In some aspects, a CC of the CC group may include a FDD CC, a TDD CC, a System Frame Type 3 CC, and/or the like. In some aspects, only a CC of a FDD CC can be included in the group, where a TDD CC or a System Frame Type 3 CC is excluded. In some aspects, the CC group may include a combination of two or more of a FDD CC, a TDD CC, and/or a System Frame Type 3 CC. For example, when the CC group includes a mixture of different types of CCs, an FDD CC may be used for a primary cell of the UE 802. For example, in some aspects, TDD CCs may be excluded from a CC group. In some aspects, a TDD cell may be used as a Pcell, which may create complexity in terms of scheduling and HARQ feedback.

When the CC group includes a TDD CC, particular subframes may not be used for URLLC traffic. For example, assume that a CC group includes three CCs, of which one is a TDD CC. Assume further that downlink URLLC traffic is to be provided on the CC group. The TDD CC may include one or more special subframes and/or one or more uplink subframes, during which the downlink URLLC traffic cannot be provided. Therefore, at times corresponding to the special subframes or uplink subframes, the CC group may effectively include three CCs. The eNB 804 may selectively divide the URLLC traffic on the CCs according to availability of the TDD CC.

As an example of changing an effective quantity of CCs, refer to FIG. 8C. As shown in FIG. 8C, at subframe 0, the UE 804 may be associated with two downlink CCs (e.g., the Pcell DL FDD CC and the Scell TDD CC) and one uplink CC (e.g., the Pcell UL FDD CC). At subframe 1, the UE 804 may be associated with one downlink CC (e.g., the Pcell DL FDD CC) and one uplink CC (e.g., the Pcell UL FDD CC). At subframe 2, the UE 804 may be associated with two uplink CCs (e.g., the Scell TDD CC and the Pcell UL FDD CC) and one downlink CC (e.g., the Pcell DL FDD CC). Thus, the eNB 804 may dynamically determine the group of CCs based at least in part on availability or configuration of the CCs for downlink or uplink traffic.

In some aspects, the eNB 804 may select CCs of the CC group based at least in part on a configuration of a multicast-broadcast single-frequency network (MBSFN) subframe of a CC. For example, when the URLLC traffic is cell-specific reference signal (CRS) based, the URLLC traffic may not be supported in an MBSFN subframe of a CC. Therefore, the eNB 804 may include a particular CC in a CC group when the particular CC does not include an MBSFN subframe, and may not include the particular CC in the CC group otherwise.

In some aspects, the eNB 804 may include a same set of uplink CCs as downlink CCs in the CC group. For example, when URLLC is configured on a per-UE basis (as compared to per-link), the eNB 804 may include the same set of uplink CCs and downlink CCs and/or the uplink CC group and downlink CC group may be jointly configured. Additionally, or alternatively, when URLLC is configured on a per-link basis (e.g., only configured for uplink or only configured for downlink), the eNB 804 may use a different set of uplink CCs than downlink CCs or the uplink CC group may be separately configured from the downlink CC group. In some aspects, a CC group of uplink CCs for a particular UE 802 may include different CCs than a CC group of downlink CCs for the particular UE 802. This is particularly possible for the case when CA or DC configured for a UE 802 is asymmetric in DL and UL. As an example, a UE 802 may be configured with 5 CCs in DL and 1 CC in UL for CA. In this case, the CC group of downlink CCs can be of two or more CCs while the CC group of uplink CCs is limited to the single uplink CC configured for CA for the UE 802.

Returning to FIG. 8A, and as shown by reference number 816, the eNB 804 may divide the URLLC communication into portions corresponding to the carriers of the CC group. For example, the eNB 804 may divide the URLLC communication into a quantity of portions equal to a quantity of CCs of the CC group. For a more detailed description of resource allocation with regard to the CC group, refer to the description associated with reference number 818, below.

As shown by reference number 818, the eNB 804 may provide the portions on the respective carriers of the CC group. For example, as shown by reference numbers 820-1 through 820-3, respective portions of the URLLC communication may be allocated on carriers 1 through 3. The eNB 804 may transmit the portions of the URLLC communication on the respective carriers.

In some aspects, resource allocation of the CC group may be jointly managed for CCs of the CC group. For example, assume that the CC group includes four CCs that each has a bandwidth of 20 MHz. Assume further that the four CCs collectively include 400 resource blocks (RBs) that can be allocated for the URLLC traffic. In such a case, the eNB 804 may divide the four CCs into eight allocations of 50 RBs each (e.g., two to each CC), and may allocate one or more of the eight allocations based at least in part on a size of the URLLC communication. In some aspects, the eNB 804 may transmit an eight-bit bitmap in association with the URLLC communication (e.g., as part of DCI associated with the URLLC communication) that identifies which of the allocations are allocated for the URLLC communication. As another example, a contiguous resource allocation scheme may be derived based at least in part on the 8 blocks.

In some aspects, resource allocation of the CC group may be individually managed for each CC. For example, each CC may have one or more respective resource allocations. The eNB 804 may assign a first portion of the URLLC communication to be provided on a first CC, and may assign particular resources of the first CC for the first portion of the URLLC communication. The eNB 804 may then assign a second portion of the URLLC communication to be provided on a second CC, and may assign particular resources of the second CC for the second portion of the URLLC communication. Each CC may be associated with a respective resource allocation field that is used to indicate which resources have been assigned. In this way, a two-stage resource allocation process can be realized, wherein resources are first allocated on a CC basis, and are second allocated within a particular CC. Indication of the first stage (CC indexing) may be implicit or explicit. Implicit CC-indexing can be done by arranging the second stage of resource allocations in an ordered list, where each CC has its own ordering in the list.

In some aspects, resource allocation granularity may be different for different CCs. A resource allocation granularity may identify a size or arrangement of a group of resources of a CC. For example, a CC associated with a primary cell may be associated with a 25-RB block size or granularity, whereas a CC associated with a secondary cell may be associated with a 100-RB block size or granularity. Thus, interruption of non-URLLC traffic may be reduced and efficiency of resource allocation may be improved.

In some aspects, when a group of CCs are involved for uplink transmission of a transport block, single-carrier waveform may no longer to be maintained. In this case, each CC may be handed as a respective cluster, and a multi-CC PUSCH transmission may be handled as a multi-cluster PUSCH transmission.

Uplink control handling may be similar to the above. In some aspects, a single uplink CC may handle uplink control information feedback for URLLC in a CC group. For example, the single uplink CC may be associated with a Pcell or an Scell.

In some aspects, the eNB 804 may map modulation symbols of the URLLC communication in a particular order. For example, assume that a URLLC communication is to be mapped to two CCs. In some aspects, the eNB 804 may perform mapping on a per-CC basis. In such a case, the eNB 804 may map downlink traffic on a frequency first, time second basis, and may map uplink traffic on a time first, frequency second basis. For example, for a two-symbol sTTI including CC1 and CC2, on the downlink, the eNB 804 may map a sequence of modulation symbols to a first symbol to a particular sTTI of CC1, then may continue mapping the sequence of modulation symbols to a second symbol to the particular sTTI of CC1, then may continue mapping the sequence of modulation symbols to the first symbol to the particular sTTI of CC2, then may continue mapping the sequence of modulation symbols to the second symbol to the particular sTTI of CC2. Additionally, or alternatively, the eNB may map traffic jointly across CCs. For example, continuing the 2-symbol sTTI example with CC1 and CC2, the eNB 804 may map a sequence of modulation symbols to a first symbol to a particular subframe of CC1, then may continue mapping the sequence of modulation symbols to the first symbol to the particular subframe of CC2, then may continue mapping the sequence of modulation symbols to a second symbol to the particular subframe of CC1, and may finally continue mapping the sequence of symbols to the second symbol to the particular subframe of CC2. In some aspects, the eNB 804 may perform repetition of at least one modulation symbol. For example, the same set of modulation symbols may be carried by multiple CCs. This may contrast with the possibility of using all resources in the group of CCs jointly to further lower the coding rate.

In some aspects, the eNB 804 may use a single code block for the URLLC communication. For example, an LTE code block may have a maximum size of 6144 bits. When the URLLC communication is smaller than 6144 bits, the eNB 804 may use a single code block across the entire CC group. This may conserve resources that would be used for cyclic redundancy checks and/or the like.

In some aspects, the eNB 804 may split the URLLC communication into two or more code blocks. For example, when the URLLC communication is larger than 6144 bits, the eNB 804 may split the URLLC communication into two or more code blocks. Additionally, or alternatively, the eNB 804 may use a quantity of code blocks based at least in part on a quantity of CCs of the CC group. For example, each CC may include a respective code block. This approach may facilitate early decoding at the expense of additional cyclic redundancy check overhead.

As shown by reference number 822, in some aspects, the eNB 804 may provide downlink control information (DCI) in association with at least one of the portions. For example, the eNB 804 may provide DCI in association with a single CC of the CC group. For example, a UE 802 may monitor the DCI only on one CC of the group of CCs (e.g., only on a Pcell, or on a configured Scell). Alternatively, the UE 802 may monitor the DCI on two or more CCs of the group of CCs. This would provide more flexibility of where the DCI can be transmitted, at the expense of increased UE 802 complexity and battery power consumption. In such a case, the DCI may identify each CC of the CC group and/or may identify the portions of the URLLC communication to be received on each CC. Thus, resources may be conserved that would otherwise be used to provide DCI on multiple, different CCs.

As shown by reference number 824, the UE 802 may receive the DCI. The UE 802 may identify the portions of the URLLC communication based at least in part on the DCI. As shown by reference number 826, the UE 802 may decode the URLLC communication based at least in part on the DCI. For example, the DCI may include encoding information (e.g., an MCS and/or the like) and the UE 802 may use the encoding information to decode the URLLC communication. In some aspects, a single DCI may schedule the transport block spanning multiple CCs of the CC group. For example, a single MCS may be used for the transport block (e.g., as compared to different MCSs in different CCs of a URLLC CC group). Additionally, or alternatively, channel state information reporting for URLLC can be performed on a per-CC basis, and/or can be performed jointly for two or more CCs of the CC group. For example, the UE 804 may perform a single wideband channel quality information reporting for all CCs in the CC group to facilitate a single MCS operation over the set of CCs in the group.

In some aspects, the UE 802 and/or eNB 804 may perform power management of the CC group. In such a case, in some aspects, the UE 802 may use a single power management value for the entire CC group. For example, the UE 802 may use a single open loop power control function, a single closed loop power control function, a single power spectral density value, a single maximum power limitation, and/or the like. Additionally, or alternatively, the UE 802 may set a single power management value, e.g., a single maximum power limitation, based at least in part on at least one CC of the CC group. For example, the UE 802 may use a lowest maximum power limitation, may use an average maximum power limitation, may use a highest maximum power limitation, and/or the like. As an example, the power management value for the entire CC group can be configured separately from a power management value configured for other services, e.g., per-CC based eMBB services.

In some aspects, the UE 802 may manage power of one or more CC of the CC group separately. For example, the UE 802 may use a different open loop and/or a different closed loop for each CC. Additionally, or alternatively, the UE 802 may use different power spectral density values for each CC, or may use a separate power spectral density value for a PUSCH carrying a URLLC communication. Additionally, or alternatively, the UE 802 may use different open loop parameters (e.g., P_o, alpha, etc.) for each CC, or may use the same open loop parameter for all CCs.

In some aspects, one or more CCs may be associated with an uplink timing advance (TA) configuration. A timing advance configuration may apply a timing advance to UL with regard to a received DL timing. In such a case, the eNB 804 may identify a group of CCs that are associated with the same TA configuration (e.g., that are in synchronization with regard to timing advance) and may use the group of CCs to provide the URLLC communication. Additionally, or alternatively, the eNB 804 may exclude one or more CCs from a CC group when the one or more CCs have a different TA group configuration than other CCs of the CC group, which may reduce an undesirable effect of differences in uplink timing on the CC group. Additionally, or alternatively, the eNB 804 may identify a misconfiguration when CCs associated with different timing advances are included in a CC group.

In some aspects, the UE 802 may be associated with a semi-persistent scheduling (SPS) configuration or a grant-free configuration. The SPS or grant-free configuration may schedule a recurring configured downlink or uplink grant for the UE 802. In such a case, the eNB 804 may configure a plurality of CC groups for SPS or grant-free transmissions. The configuration can be via a RRC configuration or a DCI as part of activation. The eNB 804 may select a CC group of the plurality of CC groups for a particular URLLC communication based at least in part on alignment of the particular URLLC communication and an SPS or grant-free configuration associated with the CC group. For a URLLC communication, if retransmission of an SPS packet occurs via DCI, the CC group used for retransmission via the DCI can be the same CC group used for the original transmission, or can be a different CC group. A similar operation may be performed using RRC signaling.

In this way, a URLLC communication may be provided using carrier aggregation or dual connectivity in a situation where channel bandwidth of a single channel is insufficient to meet URLLC demands. Thus, URLLC may be implemented in non-flexible and/or legacy networks, such as LTE.

As indicated above, FIGS. 8A-8C are provided as an example. Other examples are possible and may differ from what is described in connection with FIGS. 8A-8C. For example, FIGS. 8A-8C are described with the eNB 804 as the transmitting device and the UE 802 as the recipient device, but, in some aspects, the UE 802 may be the transmitting device and another device (e.g., the eNB 804 and/or another UE 802) may be the recipient device.

Figure 9:
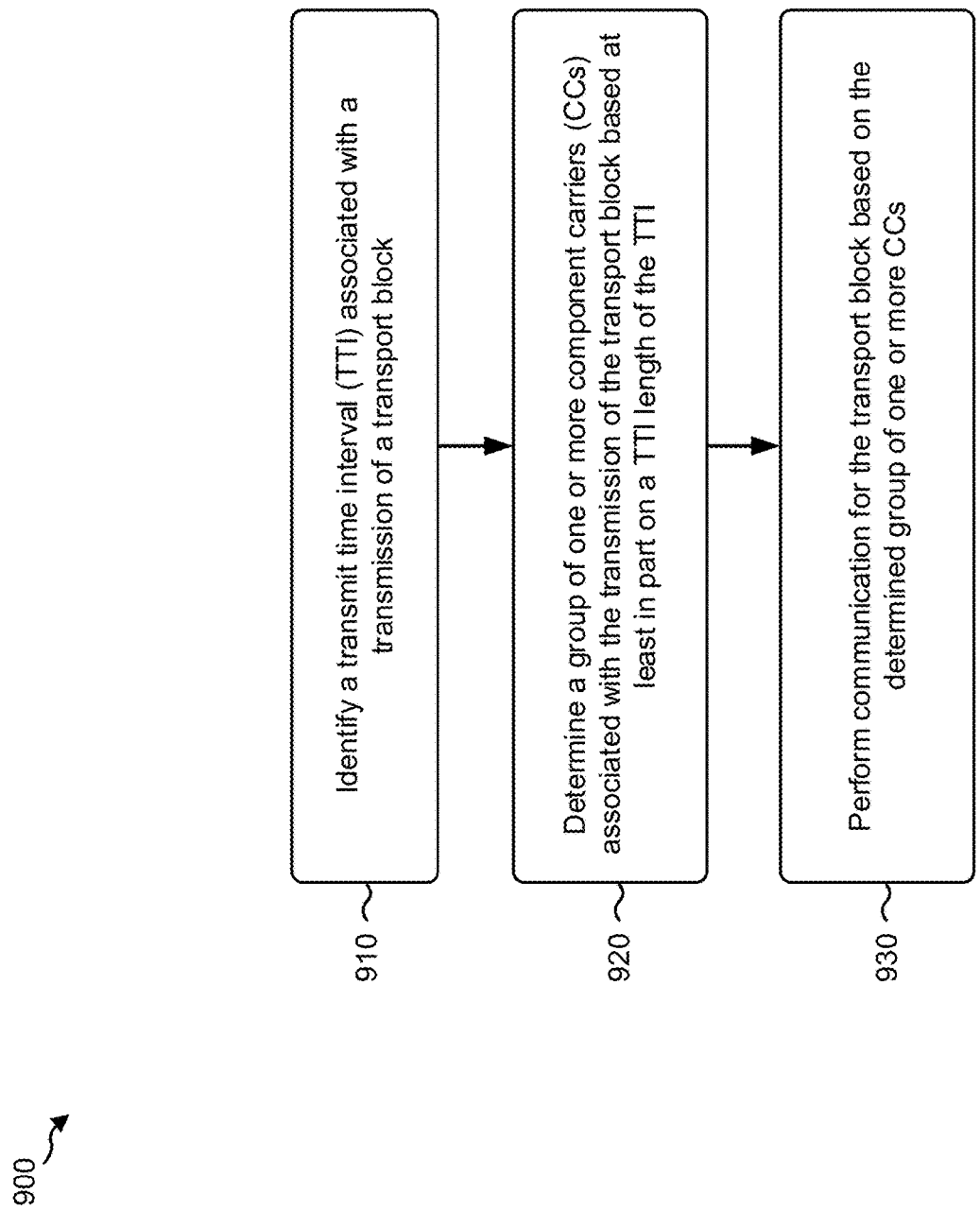
FIG. 9 is a flow chart of a method of wireless communication.

FIG. 9 is a flow chart 900 of a method of wireless communication. The method may be performed by a wireless communication device (e.g., the UE 102, 206, 650, 802, the apparatus 1002/1002').

At 910, the wireless communication device identifies a TTI associated with a transmission of a transport block. For example, the wireless communication device may identify a TTI associated with a transmission of a transport block. The transport block may be associated with a communication, such as a URLLC communication. The transport block may be associated with a latency and/or reliability requirement. For example, the transport block may be associated with a particular time interval or reliability requirement according to a URLLC technique.

At 920, the wireless communication device determines a group of one or more CCs associated with the transmission of the transport block based at least in part on a TTI length of the TTI. For example, in some aspects, the communication may be associated with performance requirements too challenging to provide on a single CC while conforming to a particular time requirement. In such a case, the wireless communication device may identify a group of CCs (e.g., uplink, downlink, and/or sidelink CCs) associated with the wireless communication device for communication of the transport block. The group of one or more CCs may be identified based at least in part on a TTI length of the TTI associated with the transport block.

At 930, the wireless communication device performs communication for the transport block based at least in part on the determined group of one or more CCs. For example, the wireless communication device may receive or transmit information of the transport block based at least in part on the determined group of one or more CCs. For example, the wireless communication device may receive or transmit portions of the transport block on each CC of the group of one or more CCs. In this way, the wireless communication device may satisfy URLLC requirements for the transport block in a fixed-channel-width network, such as LTE.

In some aspects, the TTI may comprise at least one of a one millisecond TTI, a one-slot shortened TTI, a two-symbol shortened TTI, or a one-symbol shortened TTI. However, techniques and apparatuses described herein are not limited to the above TTIs, and may apply for any TTI, such as an 8-symbol TTI or any TTI associated with 5G/NR. In some aspects, the communication is associated with at least one of a downlink communication, an uplink communication, or a sidelink communication.

In some aspects, the communication is a first communication and the group is a first group, the wireless communication device is associated with a second group of one or more CCs, and the wireless communication device is further configured to perform respective portions of a second communication based at least in part on the second group of CCs. In some aspects, at least one of the first group or the second group is associated with two or more CCs.

In some aspects, a set of CCs in the group of one or more CCs is configured using a radio resource control protocol. In some aspects, the group of one or more CCs for communication is associated with a first TTI, wherein a particular CC of the group of one or more CCs is deactivated for a second TTI. In some aspects, a set of CCs in the group of one or more CCs is determined to be different for a first TTI than for a second TTI. In some aspects, the determination of the group of one or more CCs is based at least in part on information indicated in a downlink control or radio resource control information. In some aspects, the downlink control or radio resource control information is for one of a dynamic scheduling or a grant free activation. In some aspects, a first group of one or more CCs is determined for a first time index, and a second group of one or more CCs, different from the first group of one or more CCs, is determined for a second time index.

In some aspects, all CCs in the group of one or more CCs are of a same frame structure type. In some aspects, the group of one or more CCs is comprised of at least two frame structure types. In some aspects, a CC that is configured for a frame structure type of frequency division duplexing (FDD) is associated with a primary cell of the wireless communication device. In some aspects, a set of CCs in the group of one or more CCs is based at least in part on a set of subframes that are concurrently available for respective portions of the communication, wherein the set of subframes is associated with respective CCs of the wireless communication device.

In some aspects, a set of CCs in the group of one or more CCs is based at least in part on a multicast-broadcast single frequency network (MBSFN) subframe arrangement associated with the wireless communication device. In some aspects, a set of CCs in the group of one or more CCs in an uplink direction is equal to a set of CCs in the group of one or more CCs in a downlink direction. In some aspects, a set of CCs in the group of one or more CCs in an uplink direction is different from a set of CCs in the group of one or more CCs in a downlink direction. In some aspects, downlink control information identifying the communication is received on a single CC in the group of one or more CCs.

In some aspects, a same modulation and coding scheme (MCS) is used for the communication on each CC in the group of one or more CCs. In some aspects, channel status information (CSI) is measured based at least in part on one or more CCs in the group of one or more CCs. In some aspects, downlink control information is monitored on a particular CC in the group of one or more CCs. In some aspects, resources of the group of one or more CCs are jointly managed as two or more blocks. In some aspects, each CC in the group of one or more CCs is associated with a respective resource allocation of a set of resource allocations, and scheduling of the set of resource allocations is indicated using respective resource allocation fields of each CC.

In some aspects, resources of the group of one or more CCs are allocated as two or more blocks, wherein a first block, of the two or more blocks, is of a different size than a second block of the two or more blocks. In some aspects, the communication is mapped to resource elements of the group of one or more CCs using a different mode with regard to each CC in the group of one or more CCs. In some aspects, the communication is mapped to resource elements of the group of one or more CCs using a mode jointly with regard to the group of one or more CCs.

In some aspects, the communication is included in a single code block. In some aspects, the communication is divided into at least two code blocks corresponding to at least two CCs of the group of one or more CCs. In some aspects, a single power control value is used for the group of one or more CCs. In some aspects, a respective power control value is used for each CC in the group of one or more CCs. In some aspects, each CC in the group of one or more CCs is associated with a same uplink timing advance group. In some aspects, the wireless communication device is associated with multiple groups of one or more CCs including the group of one or more CCs, and a particular group of one or more CCs, of the multiple groups of one or more CCs, is scheduled for transmission of the communication.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
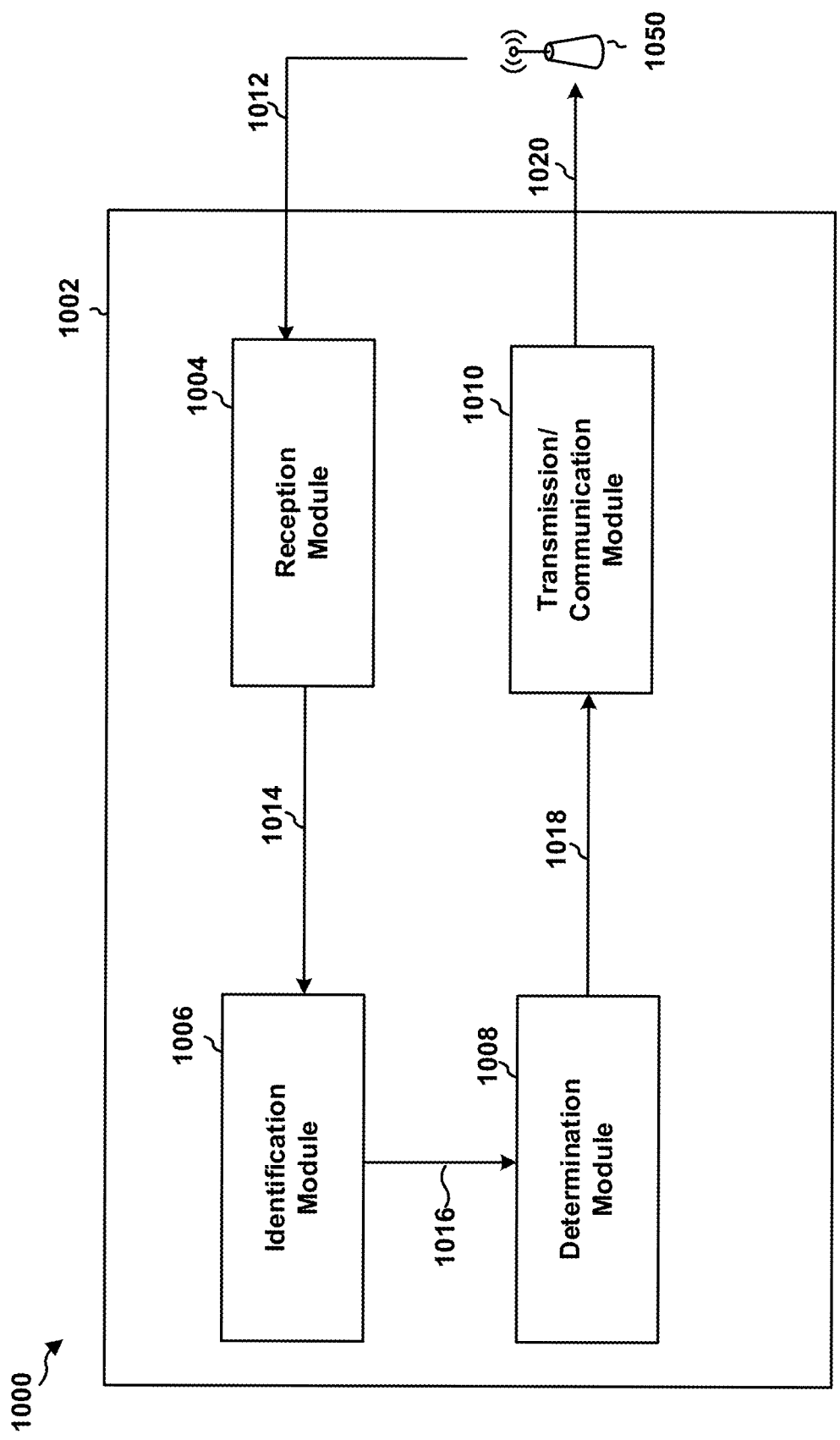
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a wireless communication device (e.g., the UE 102, 206, 650, 802). In some aspects, the apparatus 1002 includes a reception module 1004, an identification module 1006, a determination module 1008, and/or a transmission/communication module 1010.

The reception module 1004 may receive signals 1012 from a device 1050 (e.g., the eNB 106, 204, 610, 804, another UE 102, 206, 650, 802, another apparatus 1002/1002', the apparatus 1302/1302', and/or the like). The signals 1012 may include, for example, a transport block, URLLC traffic, downlink control information regarding the transport block or URLLC traffic, and/or the like. In some aspects, the signals 1012 may be received on multiple, different CCs (e.g., a group of one or more CCs associated with URLLC traffic, as described herein). The reception module 1004 may process (e.g., demodulate) the signals 1012 to generate data 1014, and may provide the data 1014 to the identification module 1006.

The identification module 1006 may identify a TTI, of the data 1014, associated with transmission of the transport block. In some aspects, the identification module 1006 may provide the transport block and/or information identifying the TTI or a length of the TTI to the determination module 1008 as data 1016.

The determination module 1008 may determine a group of one or more CCs associated with transmission of the transport block based at least in part on a TTI length of the TTI. In some aspects, the determination module 1008 may select the group of one or more CCs, or may identify the group of one or more CCs based at least in part on information received from the identification module 1006 (e.g., information identifying the at least two CCs or a plurality of CCs from which the at least two CCs are to be selected). The determination module 1008 may provide the transport block, or modulation symbol sequences of the transport block, to the transmission/communication module 1010 as data 1018. The transmission/communication module 1010 may perform communication for the transport block based at least in part on the determined group of one or more CCs. For example, the transmission/communication module may transmit the portions of the communication, as signals 1020, on the one or more CCs of the group. Additionally, or alternatively, the determination module 1008 may provide data to the reception module 1004 to configure the reception module 1004 to receive a transport block on the group of one or more CCs.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
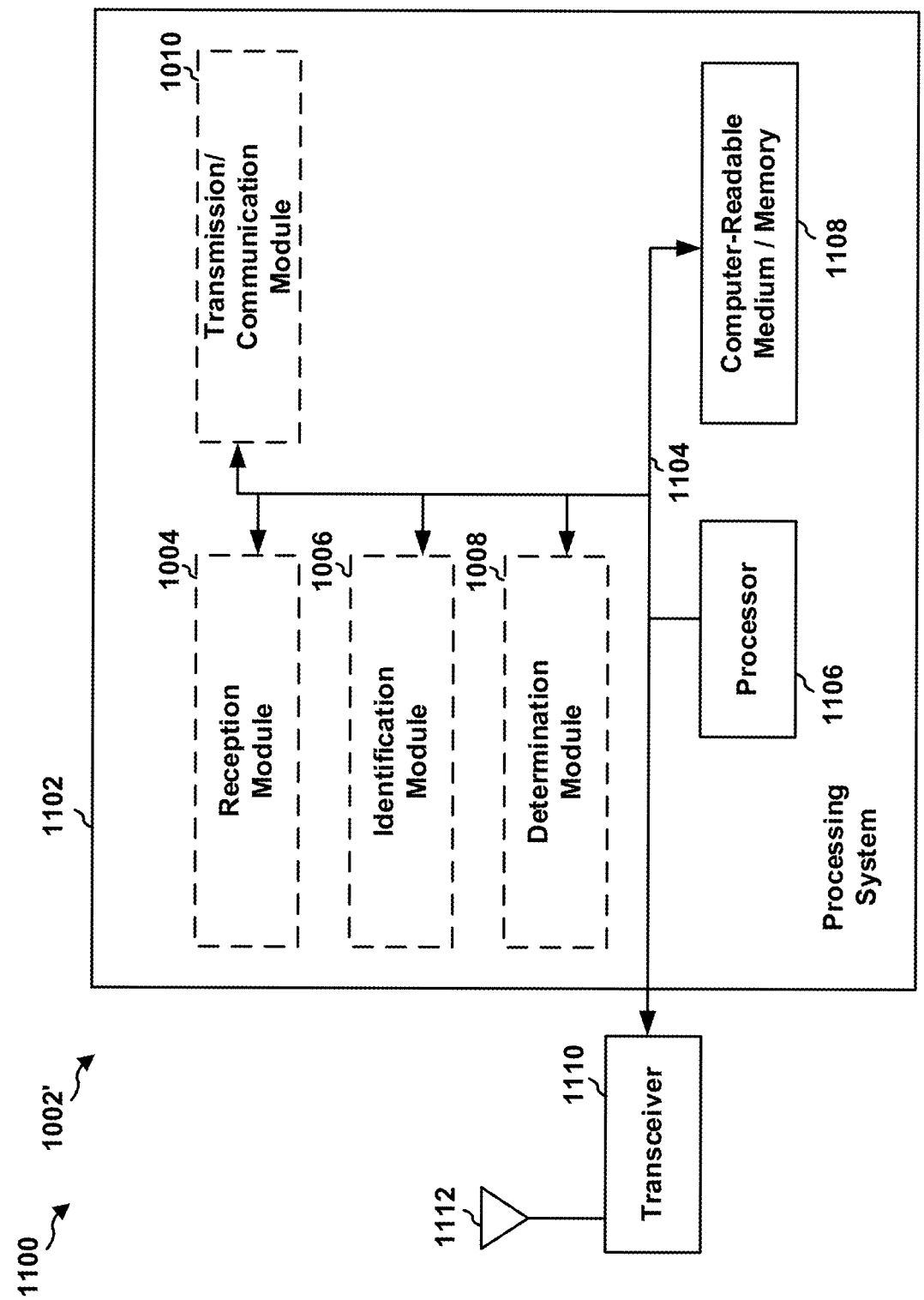
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a wireless communication device (e.g., the UE 102, 206, 650, 802, the apparatus 1002, and/or the like).

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, and 1010. The modules may be software modules running in the processor 1106, resident/stored in the computer readable medium/memory 1108, one or more hardware modules coupled to the processor 1106, or some combination thereof. In some aspects, the processing system 1102 may be a component of the UE 650 and may include the memory 660 and/or at least one of the TX processor 668, the RX processor 656, and/or the controller/processor 659.

In some aspects, the apparatus 1002/1002' for wireless communication includes means for identifying a TTI associated with a transmission of a transport block; means for determining a group of one or more CCs associated with the transmission of the transport block based at least in part on a TTI length of the TTI; and/or means for performing communication for the transport block based at least in part on the determined group of one or more CCs. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX processor 668, the RX processor 656, and/or the controller/processor 659. As such, in one configuration, the aforementioned means may be the TX processor 668, the RX processor 656, and/or the controller/processor 659 configured to perform the functions recited by the aforementioned means.

FIG. 11 is provided as an example. Other examples are possible and may differ from what was described in connection with FIG. 11.

Figure 12:
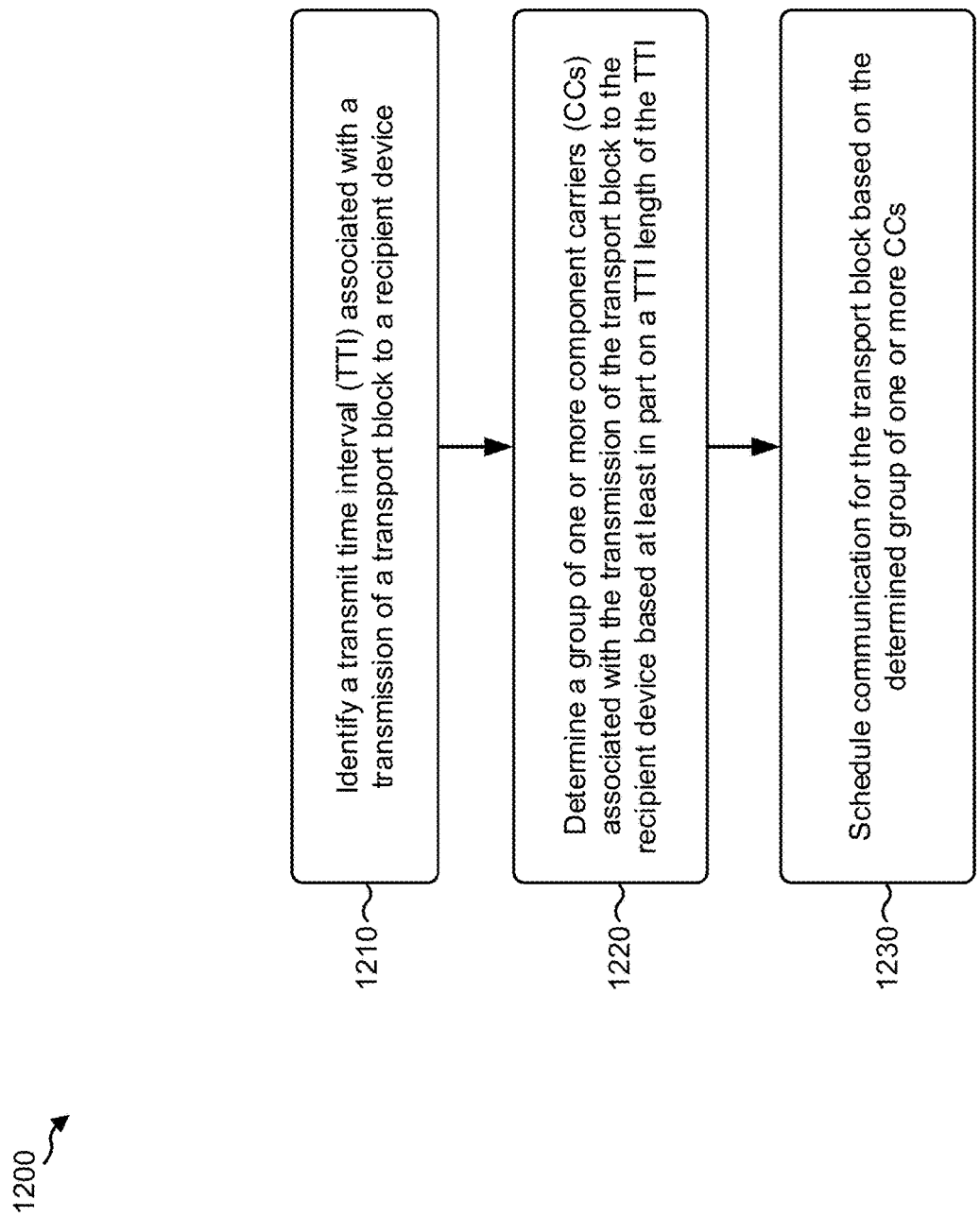
FIG. 12 is another flow chart of a method of wireless communication.

FIG. 12 is a flow chart 1200 of a method of wireless communication. The method may be performed by a base station (e.g., the eNB 106, 204, 610, 804, the apparatus 1302/1302').

At 1210, the base station identifies a TTI associated with a transmission of a transport block to a recipient device. For example, the base station may identify a TTI associated with a transmission of a transport block, such as a communication or packet associated with URLLC traffic. The transport block may be en route to a recipient device, such as the base station, a UE, and/or the like.

At 1220, the base station determines a group of one or more CCs associated with the transmission of the transport block to the recipient device based at least in part on a TTI length of the TTI. For example, the base station may identify a group of one or more CCs associated with the transmission of the transport to the recipient device. The base station may identify the group of one or more CCs so that the transport block can be provided in accordance with URLLC requirements and/or the like. In some aspects, the group of one or more CCs may be between the base station and the recipient device, or may be between the recipient device and another device. For example, the one or more CCs may be uplink, downlink, and/or sidelink CCs.

At 1230, the base station schedules communication for the transport block based at least in part on the determined group of one or more CCs. For example, the base station may schedule communication for the transport block based at least in part on the determined group of one or more CCs. In some aspects, the base station may schedule portions of the transport block to be transmitted on each CC of the group. Additionally, or alternatively, the base station may transmit the portions of the transport block on each CC of the group. Additionally, or alternatively, the base station may provide scheduling information to the recipient device, or to a transmitting device that is to transmit the transport block on the group of one or more CCs, identifying the scheduling of the transport block to be transmitted on the one or more CCs.

In some aspects, the TTI comprises at least one of a one millisecond TTI, a one-slot shortened TTI, a two-symbol shortened TTI, or a one-symbol shortened TTI. In some aspects, the communication is associated at least one of a downlink communication, an uplink communication, or a sidelink communication. In some aspects, the communication is a first communication and the group is a first group, the recipient device is associated with a second group of one or more CCs, and the base station is further configured to schedule respective portions of a second communication based at least in part on the second group of CCs. In some aspects, at least one of the first group or the second group is associated with two or more CCs. In some aspects, a set of CCs in the group of one or more CCs is configured using a radio resource control protocol. In some aspects, the group of one or more CCs for communication is associated with a first TTI, wherein a particular CC of the group of one or more CCs is deactivated for a second TTI. In some aspects, a set of CCs in the group of one or more CCs is determined to be different for a first TTI than for a second TTI. In some aspects, a first group of one or more CCs is determined for a first time index, and a second group of one or more CCs, different from the first group of one or more CCs, is determined for a second time index.

In some aspects, all CCs in the group of one or more CCs are of a same frame structure type. In some aspects, the group of one or more CCs is comprised of at least two frame structure types. In some aspects, a CC that is configured for a frame structure type of frequency division duplexing (FDD) is associated with a primary cell of the recipient device. In some aspects, a set of CCs in the group of one or more CCs is based at least in part on a set of subframes that are concurrently available for respective portions of the communication, wherein the set of subframes is associated with respective CCs of the recipient device.

In some aspects, a set of CCs in the group of one or more CCs is based at least in part on a multicast-broadcast single frequency network (MBSFN) subframe arrangement associated with the recipient device. In some aspects, a set of CCs in the group of one or more CCs in an uplink direction is equal to a set of CCs in the group of one or more CCs in a downlink direction. In some aspects, a set of CCs in the group of one or more CCs in an uplink direction is different from a set of CCs in the group of one or more CCs in a downlink direction. In some aspects, downlink control information identifying the communication is provided on a single CC in the group of one or more CCs. In some aspects, a same modulation and coding scheme (MCS) is used for the communication on each CC in the group of one or more CCs. In some aspects, channel status information (CSI) is measured based at least in part on one or more CCs in the group of one or more CCs. In some aspects, downlink control information is monitored on a particular CC in the group of one or more CCs. In some aspects, resources of the group of one or more CCs are jointly managed as two or more blocks.

In some aspects, each CC in the group of one or more CCs is associated with a respective resource allocation of a set of resource allocations, and the base station is configured to indicate scheduling of the set of resource allocations using respective resource allocation fields of each CC. In some aspects, the base station is configured to allocate resources of the group of one or more CCs as two or more blocks, and a first block, of the two or more blocks, is of a different size than a second block of the two or more blocks. In some aspects, the base station is configured to map the communication to resource elements of the group of one or more CCs using a mode separately with regard to each CC in the group of one or more CCs. In some aspects, the base station is configured to map the communication to resource elements of the group of one or more CCs using a mode jointly with regard to the group of one or more CCs.

In some aspects, the communication is included in a single code block. In some aspects, the communication is divided into at least two code blocks corresponding to at least two CCs of the group of one or more CCs. In some aspects, a single power control value is used for the group of one or more CCs. In some aspects, a respective power control value is used for each CC in the group of one or more CCs. In some aspects, each CC in the group of one or more CCs is associated with a same uplink timing advance group. In some aspects, the recipient device is associated with multiple groups of one or more CCs including the group of one or more CCs, and a particular group of one or more CCs, of the multiple groups of one or more CCs, is scheduled for the communication.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
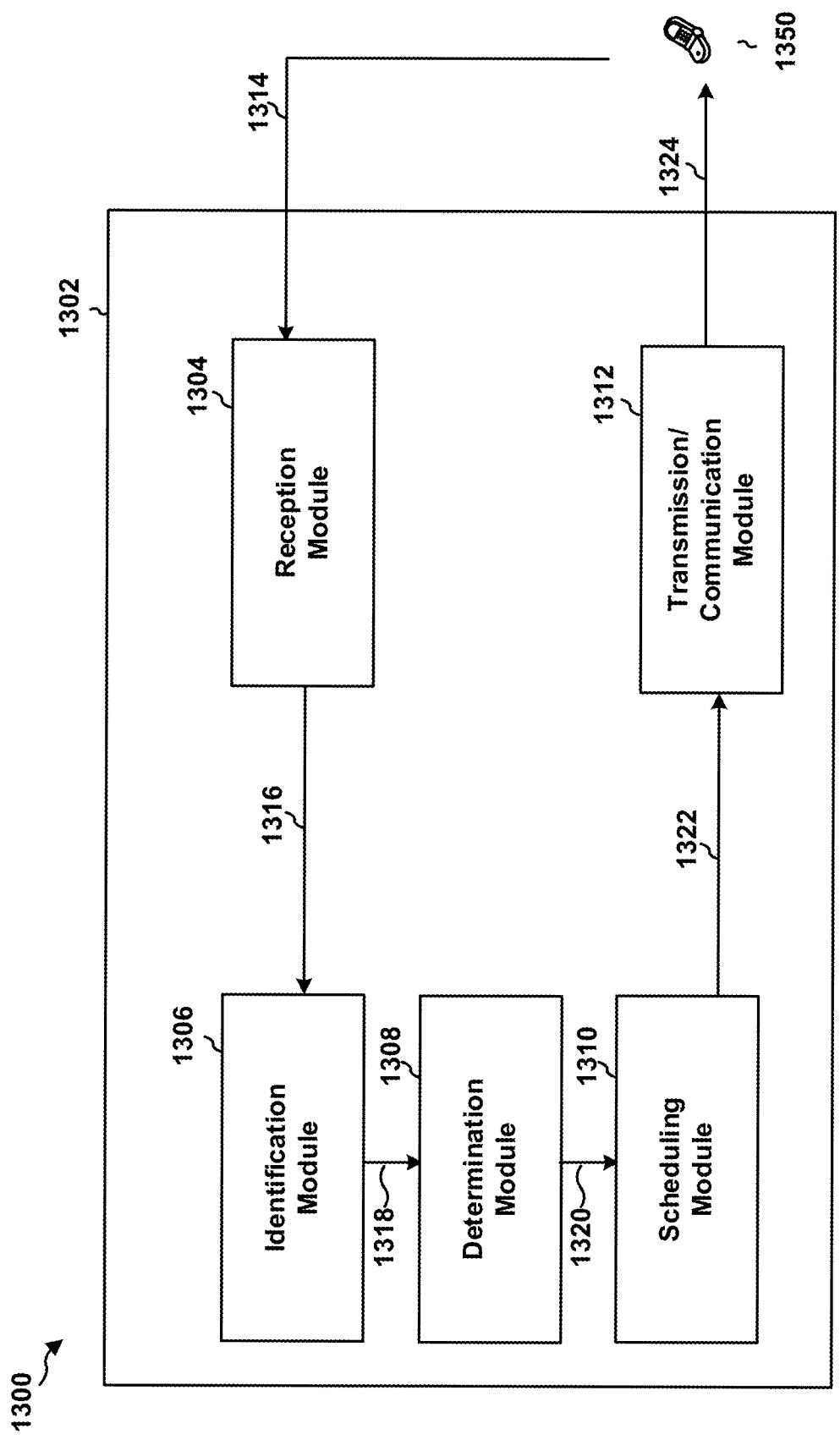
FIG. 13 is another conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a base station (e.g., the eNB 106, 204, 610, 804). In some aspects, the apparatus 1302 includes a reception module 1304, an identification module 1306, a determination module 1308, a scheduling module 1310, and/or a transmission/communication module 1312.

The reception module 1304 may receive signals 1314 from a wireless communication device 1350 (e.g., the eNB 106, 204, 610, 804, the UE 102, 206, 650, 802, an apparatus 1002/1002', and/or the like). The signals 1314 may include, for example, a transport block and/or URLLC traffic of a transmission to be provided to a recipient device (e.g., the wireless communication device 1350 and/or the like). In some aspects, the signals 1314 may be received on a wired or backhaul connection. Additionally, or alternatively, the signals 1314 may be received over an air interface. The reception module 1304 may process (e.g., demodulate) the signals 1314 to generate data 1316, and may provide the data 1314 to the identification module 1306.

The identification module 1306 may identify a TTI associated with a transmission of the transport block to a recipient device. For example, the identification module 1306 may identify the TTI based at least in part on the transport block, identifying information associated with the transport block, information associated with the recipient device, and/or the like. The identification module 1306 may provide information identifying the TTI, the transport block, and/or the like to the determination module 1308 as data 1318.

The determination module 1308 may determine a group of one or more CCs associated with the transmission of the transport block to the recipient device based at least in part on a TTI length of the TTI. For example, the determination module may determine the group of one or more CCs based at least in part on information identifying the one or more CCs associated with the recipient device, based at least in part on selecting the group of one or more CCs from a plurality of CCs associated with the recipient device, and/or the like. In some aspects, the determination module 1306 may provide data to the scheduling module 1310 as data 1320.

The scheduling module 1310 may schedule communication for the transport block based at least in part on the determined group of one or more CCs. For example, the scheduling module 1310 may schedule downlink, uplink, or sidelink resources of the apparatus 1302 and/or wireless communication device 1350 for communication of the transport block. For example, the scheduling module 1310 may schedule resources of the group of one or more CCs for communication of the transport block. The scheduling module 1310 may provide data 1322 to the transmission/communication module 1312 and/or the reception module 1304. The data 1322 may identify the transport block, the group of one or more CCs, and/or scheduling information identifying the scheduled resources. The transmission/communication module 1312 and/or the reception module 1304 may perform communication 1324 for the transport block based at least in part on the data 1320 and/or the determined group of one or more CCs.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
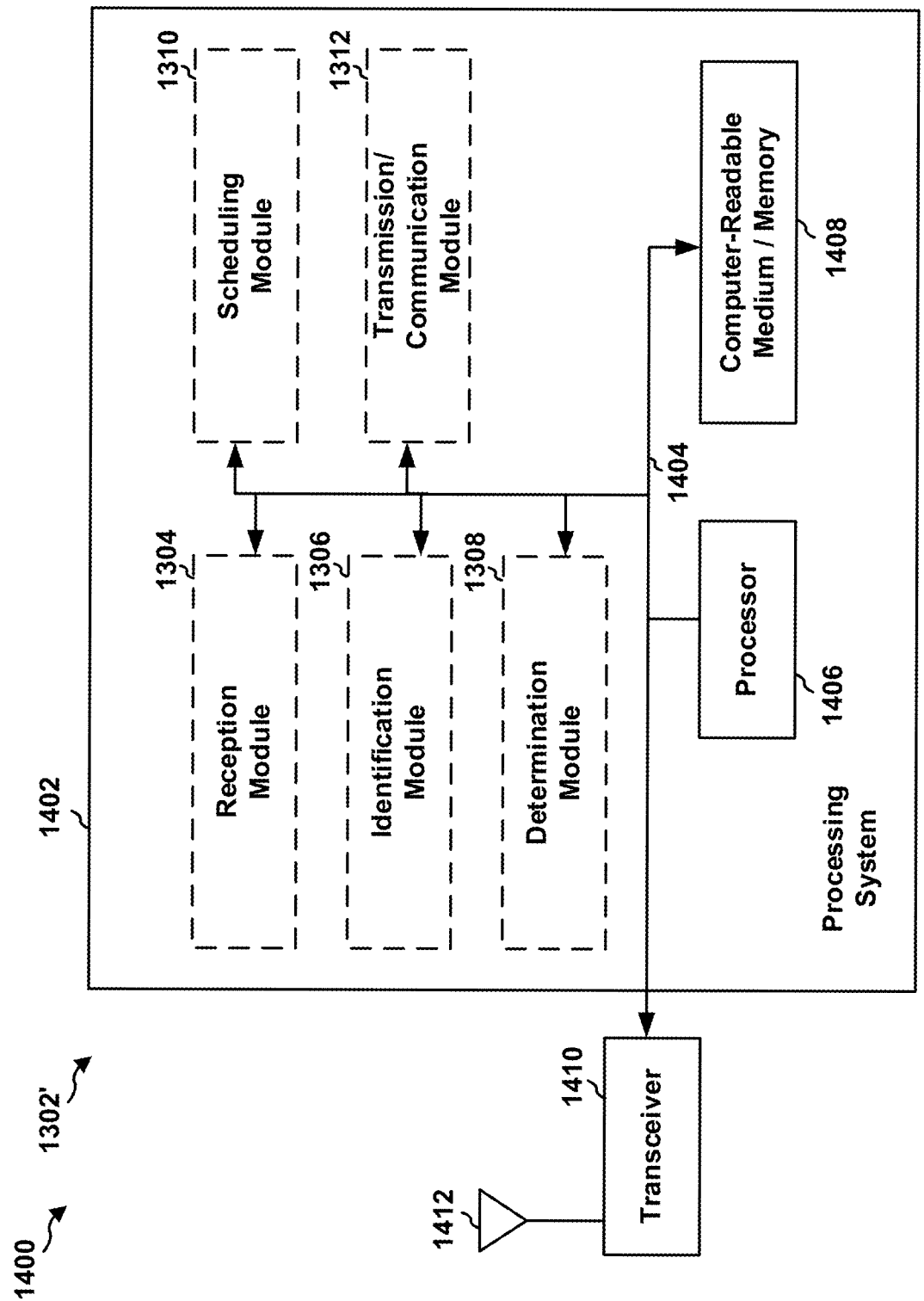
FIG. 14 is another diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a wireless communication device (e.g., the eNB 106, 204, 610, 804, the apparatus 1302, and/or the like).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, 1310, 1312, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission/communication module 1312, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, 1310, and 1312. The modules may be software modules running in the processor 1406, resident/stored in the computer-readable medium/memory 1408, one or more hardware modules coupled to the processor 1406, or some combination thereof. In some aspects, the processing system 1402 may be a component of the eNB 610 and may include the memory 676 and/or at least one of the TX processor 616, the RX processor 670, and/or the controller/processor 675.

In some aspects, the apparatus 1302/1302' for wireless communication includes means for identifying a TTI associated with a transmission of a transport block to a recipient device; means for determining a group of one or more CCs associated with the transmission of the transport block to the recipient device based at least in part on a TTI length of the TTI; and/or means for scheduling communication for the transport block based at least in part on the determined group of one or more CCs. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX processor 616, the RX processor 670, and the controller/processor 675. As such, in one configuration, the aforementioned means may be the TX processor 616, the RX processor 670, and the controller/processor 675 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a wireless communication device, comprising:
   identifying a transmit time interval (TTI) associated with a transmission of a transport block included in an ultra-reliable low latency communication (URLLC);
   configuring a URLLC group of component carriers (CCs) associated with the transmission of the transport block to satisfy a performance requirement for the transmission of the transport block that is not capable of being satisfied by a single CC,
      a number of CCs in the URLLC group of CCs being selected from a plurality of configurable numbers of CCs for the URLLC group of CCs based at least in part on a TTI length of the TTI associated with the transmission of the transport block, and
      the number of CCs in the URLLC group of CCs being limited to less than a number of CCs configured for the wireless communication device for carrier aggregation; and
   performing communication for the transport block based at least in part on the URLLC group of CCs.

2. The method of claim 1, wherein the TTI comprises at least one of a one millisecond TTI, a one-slot shortened TTI, a two-symbol shortened TTI or a one-symbol shortened TTI.

3. The method of claim 1, wherein the communication is a first communication and the URLLC group of CCs is a first group of CCs; and
   wherein the wireless communication device is associated with a second group of CCs; and
   wherein the wireless communication device is further configured to perform respective portions of a second communication based at least in part on the second group of CCs.

4. The method of claim 3, wherein at least one of the first group of CCs or the second group of CCs is associated with two or more CCs.

5. The method of claim 1, wherein the URLLC group of CCs for communication is associated with a first TTI, wherein a particular CC of the URLLC group of CCs is deactivated for a second TTI.

6. The method of claim 1, wherein the number of CCs in the URLLC group of CCs is determined to be different for a first TTI, having a first length, than for a second TTI, having a second length.

7. The method of claim 1, wherein the URLLC group of CCs is determined based at least in part on information indicated in a downlink control or radio resource control information for one of a dynamic scheduling or a grant free activation.

8. The method of claim 1, wherein a first URLLC group of CCs is determined for a first time index, and a second URLLC group of CCs, different from the first group of URLLC CCs, is determined for a second time index.

9. The method of claim 1, wherein all CCs in the URLLC group of CCs are of a same frame structure type.

10. The method of claim 1, wherein a CC that is configured for a frame structure type of frequency division duplexing (FDD) is associated with a primary cell of the wireless communication device.

11. The method of claim 1, wherein a set of CCs in the URLLC group of CCs is based at least in part on a set of subframes that are concurrently available for respective portions of the communication, wherein the set of subframes is associated with respective CCs of the wireless communication device.

12. The method of claim 1, wherein a particular CC, of the CCs configured for the wireless communication device for carrier aggregation, is included in the URLLC group of CCs based on whether the particular CC includes a multicast-broadcast single-frequency network (MBSFN) subframe.

13. The method of claim 1, wherein a set of CCs in the URLLC group of CCs in an uplink direction is equal to a set of CCs in the URLLC group of CCs in a downlink direction.

14. The method of claim 1, wherein a set of CCs in the URLLC group of CCs in an uplink direction is different from or managed separately from a set of CCs in the URLLC group of CCs in a downlink direction.

15. The method of claim 1, wherein downlink control information identifying the communication is received on a single CC in the URLLC group of CCs.

16. The method of claim 1, wherein each CC in the URLLC group of CCs is associated with a respective resource allocation of a set of resource allocations; and
wherein scheduling of the set of resource allocations is indicated using respective resource allocation fields of each CC.

17. The method of claim 1, wherein resources of the URLLC group of CCs are allocated or jointly managed as two or more blocks; and
wherein a first block, of the two or more blocks, is of a different size than a second block of the two or more blocks.

18. The method of claim 1, wherein the communication is mapped to resource elements of the URLLC group of CCs using a different mode with regard to each CC in the URLLC group of CCs.

19. The method of claim 1, wherein the communication is included in a single code block.

20. The method of claim 1, wherein a respective power control value is used for each CC in the URLLC group of CCs.

21. The method of claim 1, wherein each CC in the URLLC group of CCs is associated with a same uplink timing advance group.

22. The method of claim 1, wherein the wireless communication device is associated with multiple groups of CCs including the URLLC group of CCs; and
wherein a particular group of CCs, of the multiple groups of CCs, is scheduled for transmission of the communication.

23. A base station for wireless communication, comprising:
a memory; and
at least one processor operatively coupled to the memory, the memory and the at least one processor configured to:
identify a transmit time interval (TTI) associated with a transmission of a transport block included in an ultra-reliable low latency communication (URLLC) to a recipient device;
determine a single component carrier (CC) is not capable of satisfying a performance requirement for the transmission of the transport block;
configure a URLLC group of CCs associated with the transmission of the transport block to the recipient device to satisfy the performance requirement,
a number of CCs in the URLLC group of CCs being selected from a plurality of configurable numbers of CCs for the URLLC group of CCs based at least in part on a TTI length of the TTI associated with the transmission of the transport block, and
the number of CCs in the URLLC group of CCs being limited to less than a number of CCs configured for a wireless communication device for carrier aggregation; and
schedule communication for the transport block based at least in part on the URLLC group of CCs.

24. The base station of claim 23, wherein the TTI comprises at least one of a one millisecond TTI, a one-slot shortened TTI, a two-symbol shortened TTI, or a one-symbol shortened TTI.

25. The base station of claim 23, wherein the URLLC group of CCs is associated with two or more CCs.

26. The base station of claim 23, wherein the number of CCs in the URLLC group of CCs is determined to be different for a first TTI, having a first length, than for a second TTI, having a second length.

27. The base station of claim 23, wherein a set of CCs in the URLLC group of CCs is based at least in part on a set of subframes that are concurrently available for respective portions of the communication,
wherein the set of subframes is associated with respective CCs of the recipient device.

28. The base station of claim 23, wherein each CC in the URLLC group of CCs is associated with a respective resource allocation of a set of resource allocations; and
wherein the base station is configured to indicate scheduling of the set of resource allocations using respective resource allocation fields of each CC.

29. A wireless communication device for wireless communication, comprising:
a memory; and
one or more processors operatively coupled to the memory, the memory and the one or more processors configured to:
identify a transmit time interval (TTI) associated with a transmission of a transport block included in an ultra-reliable low latency communication (URLLC);
configure a URLLC group of component carriers (CCs) associated with the transmission of the transport block to satisfy a performance requirement for the transmission of the transport block that is not capable of being satisfied by a single CC,
a number of CCs in the URLLC group of CCs being selected from a plurality of configurable numbers of CCs for the URLLC group of CCs based at least in part on a TTI length of the TTI associated with the transmission of the transport block, and
the number of CCs in the URLLC group of CCs being limited to less than a number of CCs configured for the wireless communication device for carrier aggregation; and
perform communication for the transport block based at least in part on the URLLC group of CCs.

30. A method of wireless communication performed by a base station, comprising:
identifying a transmit time interval (TTI) associated with a transmission of a transport block included in an ultra-reliable low latency communication (URLLC) to a recipient device;
determining a single component carrier (CC) is not capable of satisfying a performance requirement for the transmission of the transport block;
configuring a URLLC group of CCs associated with the transmission of the transport block to the recipient device to satisfy the performance requirement, a number of CCs in the URLLC group of CCs being selected from a plurality of configurable numbers of CCs for the URLLC group of CCs based at least in part on a TTI length of the TTI associated with the transmission of the transport block, and the number of CCs in the URLLC group of CCs being limited to less than a number of CCs configured for a wireless communication device for carrier aggregation; and scheduling communication for the transport block based at least in part on the URLLC group of CCs.

* * * * *